US012244940B2

(12) United States Patent
Beziaeva et al.

(10) Patent No.: US 12,244,940 B2
(45) Date of Patent: *Mar. 4, 2025

(54) DETERMINING A CAMERA CONTROL POINT FOR VIRTUAL PRODUCTION

(71) Applicants: Nant Holdings IP, LLC, Culver City, CA (US); NantStudios, LLC, Culver City, CA (US)

(72) Inventors: Liudmila A. Beziaeva, El Segundo, CA (US); Gary Marshall, Culver City, CA (US); Adolfo Sanchez, Culver City, CA (US); Juan Alfredo Nader Delgado, Culver City, CA (US)

(73) Assignees: Nant Holdings IP, LLC, Culver City, CA (US); NantStudios, LLC, Culver City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/414,192

(22) Filed: Jan. 16, 2024

(65) Prior Publication Data

US 2024/0155257 A1 May 9, 2024

Related U.S. Application Data

(63) Continuation of application No. 18/201,001, filed on May 23, 2023, now Pat. No. 11,924,561.
(Continued)

(51) Int. Cl.
*H04N 23/90* (2023.01)
*G06T 1/20* (2006.01)
(Continued)

(52) U.S. Cl.
CPC .............. *H04N 23/90* (2023.01); *G06T 1/20* (2013.01); *G06T 7/70* (2017.01); *H04N 23/661* (2023.01);
(Continued)

(58) Field of Classification Search
CPC ...... G06V 10/80; G06V 10/449; G06V 10/46; G06V 10/806; G06V 10/14; G06V 10/75; G06V 10/764; G06T 7/246; G06T 7/73
See application file for complete search history.

(56) References Cited

U.S. PATENT DOCUMENTS 11,748,939 B1 * 9/2023 Swanson ................. G06T 13/40
345/427
2004/0104935 A1 * 6/2004 Williamson ............ G06V 10/10
715/757
(Continued)

*Primary Examiner* — Hung H Lam
(74) *Attorney, Agent, or Firm* — Kilpatrick Townsend & Stockton LLP

(57) ABSTRACT

Systems, apparatus, and methods of rendering content based on a control point of a camera device are disclosed. In an example, a marker is attached to the camera device and its pose is tracked over time. Based on a camera model of the camera device, an offset between the marker and the control point is determined. The tracked pose of the marker can be translated and/or rotated according to the offset to estimate a pose of the control point. The rendering of the content is adjusted over time based on the estimated poses of the control point. Upon presentation of the content in a real-world space (e.g., on a display assembly located therein), the camera device can capture the content along with other objects of the real-world space and generate a video stream thereof.

20 Claims, 12 Drawing Sheets

Related U.S. Application Data

(60) Provisional application No. 63/390,255, filed on Jul. 18, 2022.

(51) Int. Cl.
*G06T 7/70* (2017.01)
*H04N 23/661* (2023.01)
*H04N 23/67* (2023.01)

(52) U.S. Cl.
CPC ... *H04N 23/67* (2023.01); *G06T 2207/10016* (2013.01); *G06T 2207/20101* (2013.01)

(56) References Cited

U.S. PATENT DOCUMENTS

2016/0343166 A1* 11/2016 Inoko .................. G06T 15/00
2019/0230297 A1* 7/2019 Knorr ................. H04N 23/673

* cited by examiner

# DETERMINING A CAMERA CONTROL POINT FOR VIRTUAL PRODUCTION

CROSS-REFERENCE TO RELATED APPLICATION

This application claims priority to, and is a continuation of, U.S. patent application Ser. No. 18/201,001, filed May 23, 2023, which claims priority to U.S. Provisional Patent Application No. 63/390,255, filed Jul. 18, 2022, and entitled "DETERMINING A CAMERA CONTROL POINT FOR VIRTUAL PRODUCTION," the content of which is hereby incorporated by reference in its entirety for all purposes.

FIELD OF THE INVENTION

The field of the invention relates to virtual production and camera control technologies.

BACKGROUND

The background description includes information that may be useful in understanding the present inventive subject matter. It is not an admission that any of the information provided herein is prior art or applicant admitted prior art, or relevant to the presently claimed inventive subject matter, or that any publication specifically or implicitly referenced is prior art or applicant admitted prior art.

A virtual production generally involves a virtual stage that presents content related to a scene, a camera device that generates cinematographic data by capturing video of persons, objects, and the content, and a motion capture system that tracks the camera, the persons, and/or the objects. The content can be dynamic (e.g., video content that changes over time), and/or its presentation can be adjusted based on the tracking.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

In some embodiments, the numbers expressing quantities or units of, for example, data used to describe and claim certain embodiments of the inventive subject matter are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the inventive subject matter are approximations, the numerical values set forth in the specific examples are reported as precisely as practicable. The numerical values presented in some embodiments of the inventive subject matter may contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the inventive subject matter and does not pose a limitation on the scope of the inventive subject matter otherwise claimed. No language in the specification should be construed as indicating any non-claimed element essential to the practice of the inventive subject matter.

Groupings of alternative elements or embodiments of the inventive subject matter disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

It should be understood that many of the foundational technical features provided in the following specification are presented to enable compact examination of the disclosed inventive subject matter. While some of the foundational technical features described herein may seem obscure, in many cases such features may be considered within the scope of understanding of one skilled in the art. Thus, presentation of such background technologies should not be considered limiting.

SUMMARY

The inventive subject matter provides systems, apparatuses, and methods of rendering content based on a control point of a camera device. Embodiments of the present disclosure are directed to, among other things, determining a pose of a control point of a camera device (e.g., its focal point).

One embodiment of the invention comprises a method that includes determining, via at least one processor, a first pose of a marker in a real-world space, wherein the marker is attached to a camera device. The method may further include determining, via the at least one processor, based on the first pose and at least one calibration parameter of the camera device, an offset between the marker and a control point of the camera device. Additionally, the method may include setting, via the at least one processor and in a computer-readable memory, a second pose of a virtual camera in a virtual space based on the offset, wherein the virtual camera represents the camera device in the virtual space, and wherein the virtual space represents the real-world space. Further, the method may include rendering, via the at least one processor and on a display, content based on the second pose of the virtual camera, wherein the content is to be captured by the camera device upon a presentation of the content in the real-world space.

Various objects, features, aspects and advantages of the inventive subject matter will become more apparent from the following detailed description of preferred embodiments, along with the accompanying drawing figures in which like numerals represent like components.

DETAILED DESCRIPTION

Figure 1:
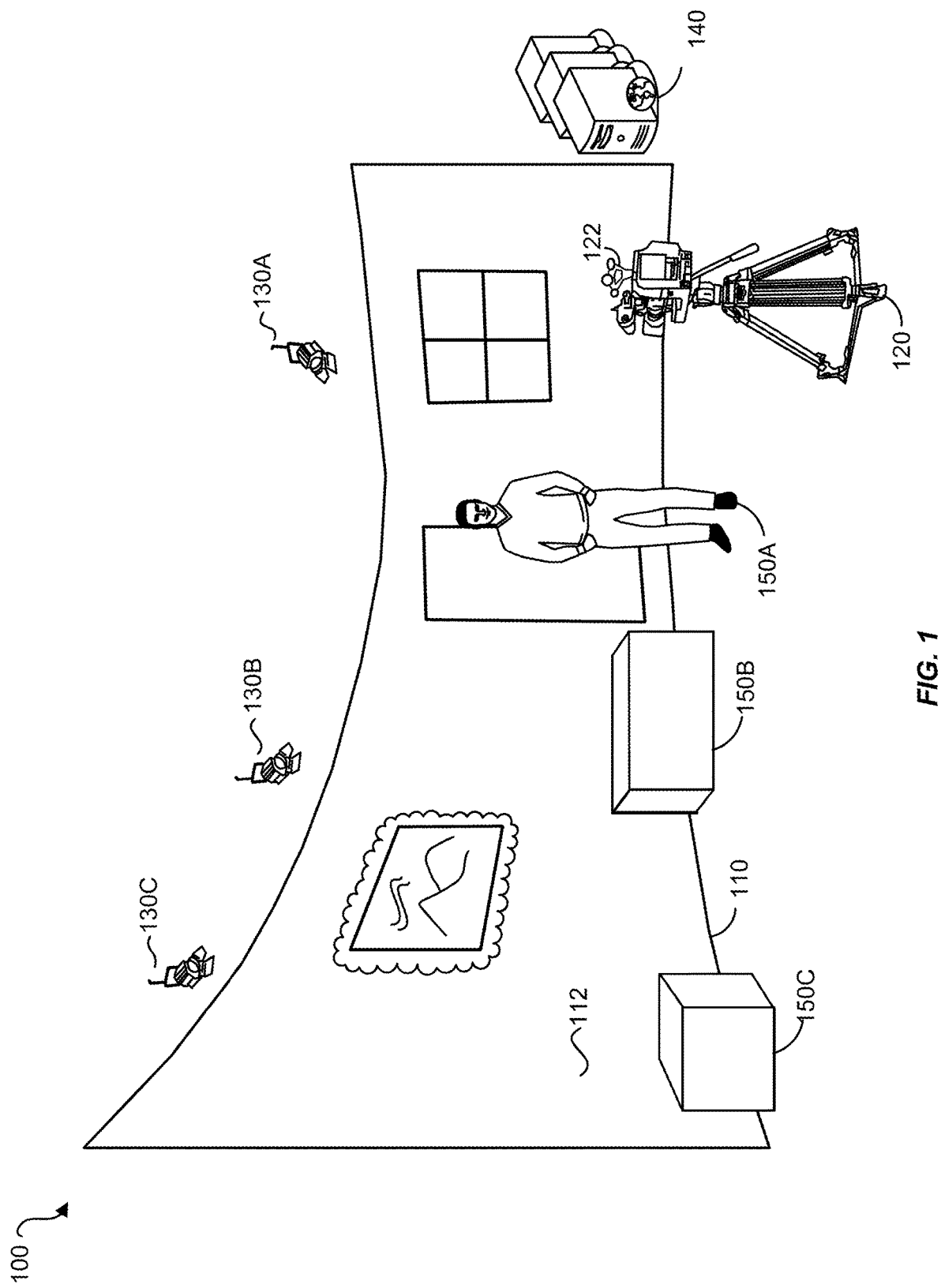
FIG. 1 illustrates an example of a virtual production system, in accordance with embodiments of the present disclosure.

It should be noted that any language directed to a computer should be read to include any suitable combination of computing devices, including servers, interfaces, systems, databases, agents, peers, engines, controllers, modules, or other types of computing devices operating individually or collectively. One should appreciate the computing devices comprise at least one processor configured to execute software instructions stored on a tangible, non-transitory computer readable storage medium (e.g., hard drive, FPGA, PLA, solid state drive, RAM, flash, ROM, etc.). The software instructions or suite of software instruction configure or program the computing device or its processors to provide the roles, responsibilities, or other functionality as discussed below with respect to the disclosed apparatus or systems. Further, the disclosed technologies can be embodied as a computer program product that includes a non-transitory computer readable medium storing the software instructions or a suite of software instructions that cause one or more processors to execute the disclosed steps associated with implementations of computer-based algorithms, processes, methods, or other instructions. In some embodiments, the various servers, systems, databases, or interfaces exchange data using standardized protocols or algorithms, possibly based on HTTP, HTTPS, TCP, UDP, FTP, SNMP, IP, AES, public-private key exchanges, web service or RESTful APIs, known financial operation protocols, or other electronic information exchanging methods. Data exchanges among devices can be conducted over a packet-switched network, the Internet, LAN, WAN, VPN, or another type of packet-switched network; a circuit-switched network; cell switched network; or another type of network, wired or wireless.

As used in the description herein and throughout the claims that follow, when a system, engine, server, agent, device, module, or other computing element is described as configured to perform or execute functions on data in a memory, the meaning of "configured to" or "programmed to" is defined as one or more processors or cores of the computing element being programmed by a set of software instructions stored in the memory of the computing element to execute the set of functions on target data or data objects stored in the memory. It should be appreciated the combination of software and hardware working in concert create a dedicated set of physical, real-world structures that provide utility to one or more users that would not exist outside the scope of the physical, real-world assets.

One should appreciate that the disclosed techniques provide many advantageous technical effects including improving the calibration of a camera device and improving the use of a control point of the camera device given its calibration. For instance, content can be rendered on a set of displays based on a pose of the control point, where the pose can be the position and/or orientation of the control point in a real-world space. The calibration includes estimating an offset between the control point and at least one marker attached to the camera device. Given this offset, the control point's pose can be tracked over time in an accurate manner by tracking the marker(s), thereby improving the quality of the content rendering.

Embodiments of the present disclosure are directed to, among other things, determining a pose of a control point of a camera device (e.g., its focal point). In an example, at least one marker is attached to the camera device, and a pose of the marker (e.g., its position, orientation, etc.) in a real-world space can be tracked over time. Given that the marker cannot be mounted to the same location as the camera device's control point due to the physicality of the camera, the marker's pose may not accurately represent the control point's pose. However, certain applications rely on the control point's pose to generate an output (e.g., content to be presented), especially output to be rendered from the perspective of the control point. As such, inaccuracies in estimating the control point's pose may impact the accuracy of the output (e.g., cause a quality issue related to presenting the content, misalignments between real and virtual items, etc.).

To improve the estimation of the control point's pose, a camera model that includes, among other things, extrinsic parameters, intrinsic parameters, and/or a distortion model of the camera device is used. Given the camera model and the marker's pose, an offset between the marker's pose and the control point's pose can be determined and can include a rotation offset and/or a position offset. Rather than setting the control point's pose to be that of the marker, the control point's pose can be estimated by offsetting the marker's pose by the rotation offset and/or the position offset as applicable. As a result, the control point's pose is more accurately estimated and tracked over time based on the marker's pose, thereby improving the accuracy of the output (e.g., mitigating a quality issue related to presenting the content).

The camera model can be determined according to a camera calibration procedure. In an example, the camera calibration procedure involves tracking the poses of an object in the real-world space, while the camera device generates images of the object in the different poses (e.g., in a video stream thereof, in still images, etc.). Each pose is associated with at least one image. The camera model can be initialized and used to determine a pose of the camera device by at least projecting poses of the object into an image plane and determining projection errors. In particular, a pose of the object (e.g., having three dimensional coordinates, etc.) is projected on the image plane and this projection is compared to the object's pixel coordinates in the associated image to determine the corresponding projection error relative to the real-world pose. The projection errors are determined across the different pose-image pairs, and a fitting model can be used to update the camera model by reducing or mitigating the projection errors.

To illustrate, consider an example of a virtual production use case. A camera device is used to generate video frames of a scene in a real-world space. Content is presented on a display assembly, typically operating as a backdrop, and forms a part of the scene. The content itself and/or its presentation can be adjusted based on the pose of the camera device's focal point (which is an example of a control point) in order to render background content on the display assembly so that the background content appears natural from the focal point perspective. The above techniques are used, whereby a motion capture system is used in a camera calibration procedure to generate the camera model, whereby a marker is attached to the camera device and tracked, and whereby the offset between the marker's pose and focal point's pose is determined. In the virtual production use case, a virtual camera device can represent the camera device in a virtual space that, in turn, represents the real-world space. The pose of the virtual camera in the virtual space is set to correspond to the focal point's pose. A game engine can render the content based on the virtual camera's pose and the rendered content is presented on the display assembly. In a further illustration, the camera model includes a distortion model. As part of the rendering, the game engine can distort a portion of the content (or the entire content) to be presented on a particular sub-area of the display assembly (or on the entire display assembly) based on the virtual camera's pose and the distortion model.

In the interest of clarity of explanation, various embodiments of the present disclosure are described in connection with a virtual production use case (e.g., production of movies using virtual backgrounds, production of augmented reality content, etc.). However, the embodiments are not limited as such and equivalently apply to other use cases such as virtual reality, augmented reality, mixed-reality, content projection (e.g., in-home theaters, movie theatres, or building, etc.), a performance stage (e.g., a music concert), and the like. Generally, embodiments of the present disclosure allow improvements to outputs of an application or a system that relies on a control point of a camera device to generate the outputs. A control point can be a physical point of the camera device, where the physical point has a corresponding virtual point in a camera model of the camera device, and where the virtual point can be used in controlling aspects of the camera device itself or of the use of the camera device (e.g., for rendering content). The pose of a control point can be along one or more dimensions and covers multiple degrees of freedom (DOF) for operating the camera device (e.g., at least six DOF). For instance, the pose can indicate the position and orientation of the camera device along each axis of a three-dimensional system and/or can correspond to movement of the camera over time (in which case the movement can be estimated based on velocity, acceleration, state information, etc. to anticipate the current, past, and/or next pose(s)). A control point may but need not necessarily translate to an actual dimensionless point. Instead, the embodiments can approximate the control point as a dimensionless point and can be used to control volumes (e.g., an ellipsoidal volume, etc.). Thus, the embodiments allow an optimization based on the camera device's specific nature. Various embodiments are also described herein by using a focal point as an example of the control point. However, the embodiments are not limited as such and equivalently apply to other types of the control point, such as one corresponding to a center point of the camera model's image plane (or a principal point) or a point between the center point and the focal point along the focal distance therebetween for example. Furthermore, the camera device may also have more than one lens (e.g., stereoscopic cameras) and/or can be a camera array of multiple individual cameras. In such situations, the control point can be associated with multiple lenses (e.g., can be the geometric center of the focal points of the lenses) and/or the camera array (e.g., can be the geometric center of the individual control points of the individual cameras).

FIG. 1 illustrates an example of a virtual production system 100, in accordance with embodiments of the present disclosure. As illustrated, the virtual production system 100 includes, among other things, a display assembly 110, a camera device 120, motion capture devices 130A, 130B, 130C (generally referenced to with the numeral "130"), and a computer system 140. The display assembly 110 can be configured as a virtual stage that presents content 112 and that defines a volume where the camera device 120 is located (a plurality of such camera devices 120 is also possible). The presentation of the content 112 can be controlled by a game engine (e.g., UNITY game engine, UNREAL game engine, Blender, etc.) executing on the computer system 140. For instance, the content 112 itself and/or parameters of the presentation (e.g., panning, angling, skew, distortion, etc.) can be controlled based on a number of factors. Among these factors are the pose of the camera device 120 in the volume. The motion capture devices 130 can generate motion capture data that is processed to determine not only poses of objects 150 (150A, 150B, 150C, generally referenced to with the numeral "150" and can be actors, stage furniture, scene furniture, equipment, and the like), but also the poses of the camera device 120. Such motion capture data can be processed and used to control the content 112 presented on the display assembly 110.

In an example, the display assembly 110 includes a plurality of displays that are arranged to form a content presentation screen or "wall." The content presentation screen can have different shapes (e.g., curved, flat intersecting surfaces, etc.) and can surround an area where the objects 150 can be located, thereby defining a volume. While the content presentation screen is illustrated as a stationary installation, in some embodiments, the screen or individual displays may be more dynamic, possibly moved around the production volume. The content presentation screen can be used to present an interactive, dynamic scene. The objects 150 can interact with such a scene and the content 112 can be updated based on the interaction (e.g., an actor 150A can interact with a virtual object presented in the content 112). Although the display assembly 110 is illustrated as having a vertical position (e.g., set up as a curved wall), the display assembly 110 (or a second display assembly) can be additionally or alternatively positioned in other positions (e.g., a horizontal position to define a ceiling or a floor, a different geometries, a 4π steradian coverage, etc.). Further, the volume can include a sliding set of displays that can be moved in and out of the volume to define a particular geometry. For instance, the volume can be shaped as a horseshoe and the sliding set can be positioned to close off the open part of the horseshoe. In this way, the camera device 120 in the volume can be surrounded with a full 360 degrees of displays. Other shapes are possible, whereby the volume can be a half dome, a full sphere (i.e., 4π steradians), a cylinder, a cube, for example. The display assembly 110 can form a volume for virtual production. This volume can include about 2,230 m² of virtual production space, where the display assembly 110 forms a curved LED wall that is about 16 m wide by 20 m long in a 270-degree oval shape (with a possible 360 degrees configuration). In a particular illustrative use case, each display of the display assembly 110 is a BLACK PEARL 2 display available from ROE CREATIVE DISPLAY. In this illustrative use case, the screen is a flat panel with dimensions of 500×500×90 mm (height×width×depth), a 176×176 resolution (horizontal× vertical), a 2.84 mm pixel pitch, a LED surface mounted diode (SMD) configuration, a magnesium frame with magnetic connectors and a lock system.

The camera device 120 can be a cinematic camera mounted on a rig (floor and/or ceiling rig) that can be re-positioned in the volume, or a moveable rig (e.g., tripod, gimble, etc.). In this way, the camera device 120 can be configured to shoot a scene by generating video data (and, optionally, audio data) showing one or more of the objects 150 and/or a portion of or the entire content 112 presented on the display assembly 110, especially from more than on perspective. The camera device 120 can have a high resolution (e.g., 4K, 6K, 8K, 12K, etc.) and available from, for instance, BLACKMAGIC (e.g., URSA MINI PRO 12K, STUDIO CAMERA 4K PLUS, STUDIO CAMERA 4K PRO, URSA BROADCAST G2, etc.), ARM (e.g., ALEXA MINI LF, ALEXA LF, ALEXA MINI, ALEXA SXT W, AMIRA, AMIRA LIVE, ARRI MULTICAM SYSTEM, etc. with an ARRI SIGNATURE PRIME 35 mm T1.8 lens, an ARRI SIGNATURE PRIME 75 mm T1.8 lens, etc.), etc.

A marker 122 can be attached to the camera device 120 (e.g., releasably mounted to a top surface thereof) and can be tracked by a motion capture system. The tracking can involve determining a pose of the marker 122. This pose may correspond to the camera device's 120 pose. The marker 122 can include multiple tracking points (each of which corresponds to an individual marker), such that the marker 122 is a marker assembly that comprises a rigid body to which the tracking points are attached. In an example, the rigid body comprises a base with arms that extends therefrom, where each tracking point is connected to an end of an arm. Six tracking points can be installed, each of which can be an individual marker from VICON (e.g., a pearl hard marker) or OPTITRACK (e.g., an M3 market, M4 marker, etc.).

The motion capture devices 130 can be motion capture cameras (e.g., infrared cameras) and/or other type of motion sensors (e.g., depth sensors) that are a part of the motion capture system configured to track motions in the volume. The motion capture system can be available from, for example, VICON (e.g., using VANTAGE, VERO, VUE, VIPER, VIPERX cameras, etc. and SHOGUN software, etc.) or OPTITRACK (e.g., using PRIME-X 41, PRIME, SLIM-X, SLIM, FLEX cameras, etc. and UNREAL PLUGIN, UNITY PLUGIN, MOTION BUILDER PLUGIN, OPTICAL MOTION CAPTURE SOFTWARE, MAYA PLUGIN software, etc.). While the motion capture system uses infrared technology, any trackable marker can be used alone or collectively including, for instance, a radio frequency marker (with radio frequency technology), a visual marker (e.g., with computer vision technology), etc. A motion of an object can be tracked by using, optionally, a motion tracker attached to the object (the marker 122 can be used to track the motion of the camera device 120). The tracking can involve locating the object in the volume by determining the positions and rotations of the object over time. A coordinate system (e.g., a Cartesian coordinate system or any other coordinate system) of the motion capture system can be defined relative to any origin in the volume.

The computer system 140 can be configured to process at least some of the motion capture data and, optionally, some of the video data. For example, the game engine can use a virtual model of the display assembly 110, a virtual camera that models the camera device 120, and a pose of the camera device 120 to render the content 112. In an example, the virtual camera's pose is set to be that of the camera device's 120 pose. As further described herein below, the camera device's 120 pose can be determined by offsetting the marker's 122 pose. The rendering can involve synthesizing multi-dimensional images and/or image frames (e.g., two-dimensional, three-dimensional, etc.) and/or applying visual transformations thereto (e.g., distortions, keystone, skewing, and/or inverse thereof) for presentation on the display assembly as the content 112. The computer system 140 can also be configured for predictive processing. For instance, given a history of the camera device's 120 motion, the computer system 140 can perform an extrapolation to predict a next set of poses (e.g., future motion) of the camera device 120. This prediction can also be based on data (which can be included as part of an executable script) that indicates a sequence of events in a scene (e.g., choreography data). Given the prediction, the computer system 140 can compute (or pre-compute) needed transformations (e.g., based on an offset between the camera marker 122 and the camera device's 120 focal point) to render the content. By doing so, the latency between an actual pose and the adjustment of the content rendering can be reduced because the computer system 140 need not actually observe first the actual pose to then compute the needed transformation as such transformation is predicted a priori the actual pose.

Figure 2:
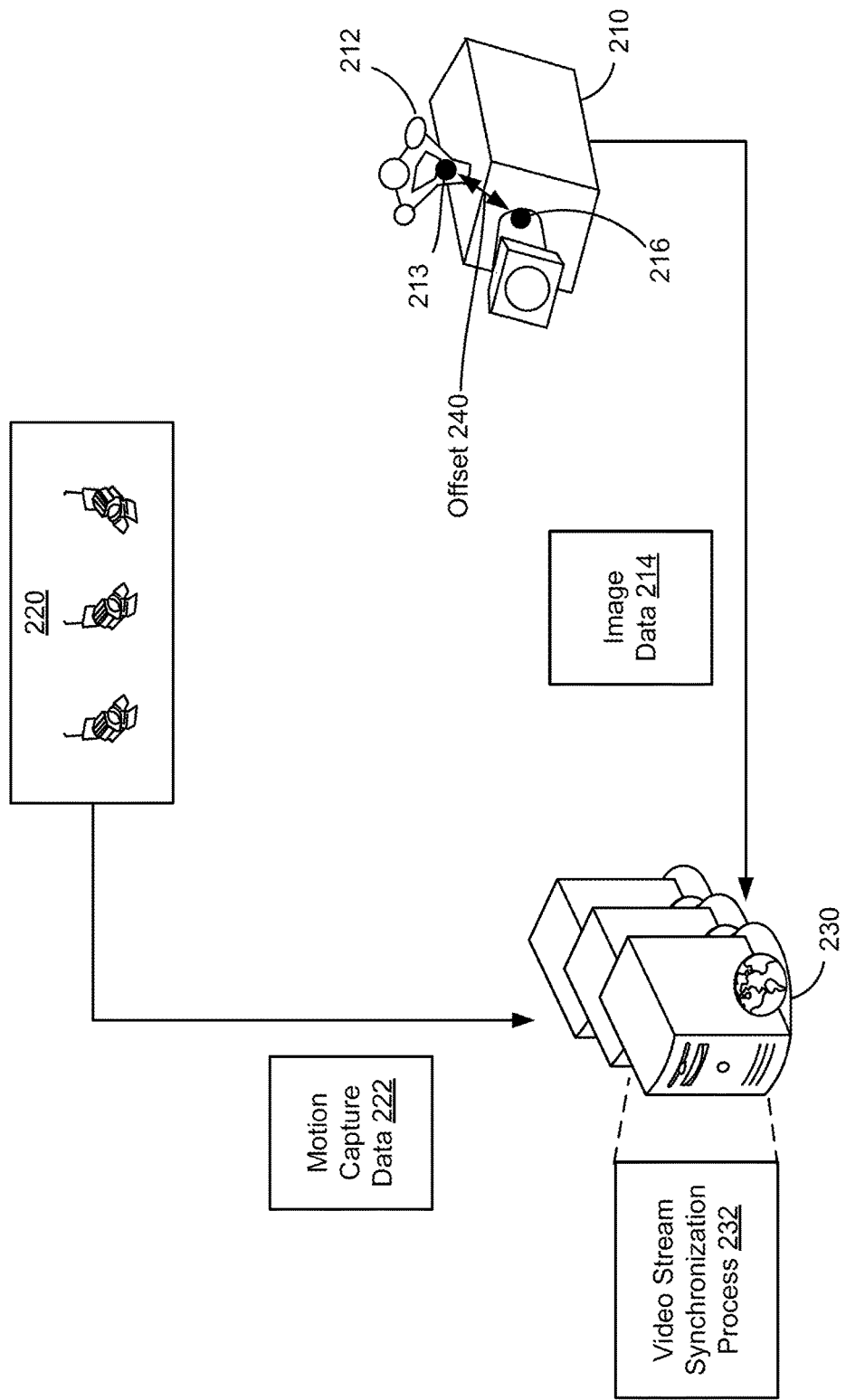
FIG. 2 illustrates an example of tracking a camera device, in accordance with embodiments of the present disclosure.

FIG. 2 illustrates an example of tracking a camera device 210, in accordance with embodiments of the present disclosure. A marker 212 is attached to the camera device 210 to enable the camera device's 210 poses to be tracked over time by a motion capture system that includes motion capture devices 220. The camera device 210 generates and sends image data 214 to a computer system 230. The image data 214 represents a video stream captured by the camera device 210. The computer system 230 also receives motion capture data 222 that indicates the camera device's 210 poses. A video stream synchronization process 232 can be executed on the computer system 230 (e.g., as a process of a game engine, some other rendering engine, etc.) to synchronize the rendering of content with the camera device's 210 poses. Upon presentation (e.g., on a display assembly, an individual display, a collection of displays, etc.), the content is captured in the video stream of the camera device 210. The camera device 210, the marker 212, the motion capture devices 220, and the computer system 230 are examples of the camera device 120, the marker 122, the motion capture devices 130, and the computer system 140, respectively, of FIG. 1.

In an example, the motion capture system implements a particular motion capture technology, such as any or a combination of infrared (IR) technology, radio frequency (RF) technology, and/or computer vision (CV) technology (e.g., available from a library of programming functions such as the Open Source Computer Vision (OpenCV) library). The IR technology can rely on active and/or passive markers that emit (e.g., transmit and/or respond) IR signals detectable by the motion capture system. The RF technology can rely on RF beaconing and/or RF signal triangulation. The CV technology can rely on image processing and object detection by one or more machine learning (ML) models (e.g., available from a library of programming functions such as the Scikit-Learn library).

In an example, the marker 212 is a rigid body that implements motion capture technology depending on the motion capture system. For instance, in the case of IR technology, the marker 212 can include one or more infrared emitting (active or passive) points (each using a different infrared frequency). Generally, the larger the number of points, the more accurate the pose estimation can become. In an example, the marker 212 includes a single point detectable by an infrared motion capture camera. In this case, at least three infrared motion capture cameras are needed to detect the pose of the marker 212. In particular, each of the three cameras would generate a two-dimensional image that shows the marker position in two dimensions. Because the position, orientation, and field of view of each camera is known, a three-dimensional vector where the marker 212 is located can be determined from the three sets of two-dimensional positions. In another example, the marker 212 includes multiple points detected by an infrared motion capture camera. In this case, a single infrared motion capture camera may suffice to detect the pose of the marker 212. In particular, the relative poses of the points are known a priori, and this knowledge is used in the processing of the images generated by the infrared motion capture camera. In virtual production, a large number of motion capture cameras may be used depending on the set-up of the virtual production. Referring back to the example virtual production of FIG. 1, more than a dozen motion capture cameras can be used including fifty to sixty motion capture cameras or more.

Of course, technologies other than infrared can be used. For instance, with the RF technology, the marker 212 can be implemented as a set of RF beacons and/or as a set of active and/or passive RF identification (RFID) tags. RF signals can be received by the motion capture devices 220 and processed to determine ranges and directions, the intersections of which can indicate the marker's 212 pose. In the case of CV technology, a two-dimensional visual marker that encodes its dimensions can be used, where an optical sensor operating in the human visible wavelength range can generate images that show the two-dimensional visual marker. The pose of the two-dimensional visual marker can be determined by decoding the dimensions and applying geometric reconstruction to the images. Further, in certain situations, the CV technology may not rely on a two-dimensional visual marker. Instead, the CV technology can detect a set of features of the camera device 210 and track the pose of this set. In this case, the marker 212 is the set of features, rather than being a rigid body that is releasably attached to the camera device 210. Such techniques can be used individually or in various combinations to reduce errors or increase precision.

Regardless of the underlying motion capture technology, the poses of the marker 212 are tracked over time and represent a motion of the marker 212. The motion can be tracked by defining a tracking point 213 on the marker 212 (e.g., the center of the rigid body, the center of one of the emitting points of the marker 212, etc.) and determining the positions and rotations of the tracking point 213 over time in a coordinate system of the motion capture system. The origin of the coordinate system can be a point in the real-world space (e.g., a point in the volume shown in FIG. 1). The motion capture data 222 can indicate the positions and rotations in the coordinate system and can be generated based on a particular rate (e.g., 24 frames per second (FPS), 60 FPS, 144 FPS, etc.).

As shown in FIG. 2, the camera device 210 can include a focal point 216. As further described in FIG. 8, the focal point 216 can be an aperture point that is at a distance away from an image plane of the camera device 210, where the distance is equal to the camera device's 210 focal length. Generally, a camera model of the camera device 210 includes extrinsic parameters that can indicate the focal point 216. Further, in some embodiments, the focal point may change as the operational parameters of the camera change (e.g., focal distance, changes of lenses, etc.). The disclosed techniques are robust with respect to such changes.

An offset 240 exists between the tracking point 213 on the marker 212 and the focal point 216 of the camera device 210. This offset 240 can include any or a combination of a position offset (e.g., indicating a relative distance between the tracking point 213 and the focal point 216) and/or a rotation offset (e.g., indicating a relative direction between the tracking point 213 and the focal point 216).

The video stream synchronization process 232 can rely on the motion of the camera device 210 to synchronize the content rendering with the video stream that the camera device 210 captures, where the synchronization can be according to acceptable thresholds. Different options exist for determining the motion. In one option, the camera device's 210 poses are set to be the same as the marker's 212 poses. In other words, the offset 240 is ignored, resulting in the focal point 216 being assumed to be the same as the tracking point 213. This option can result in errors, as further described in FIG. 3, which impact the quality of the video stream synchronization process' 232 output. In another option, the offset 240 is determined and used to transform the poses of the marker's 212 into poses of the camera device 210 (e.g., translate each pose of the tracking point 213 into a corresponding pose of the focal point 216 based on the position offset, rotate based on the rotation offset, etc.). This option can reduce, or even eliminate, the errors, thereby improving the quality of the video stream synchronization process' 232 output.

Figure 3:
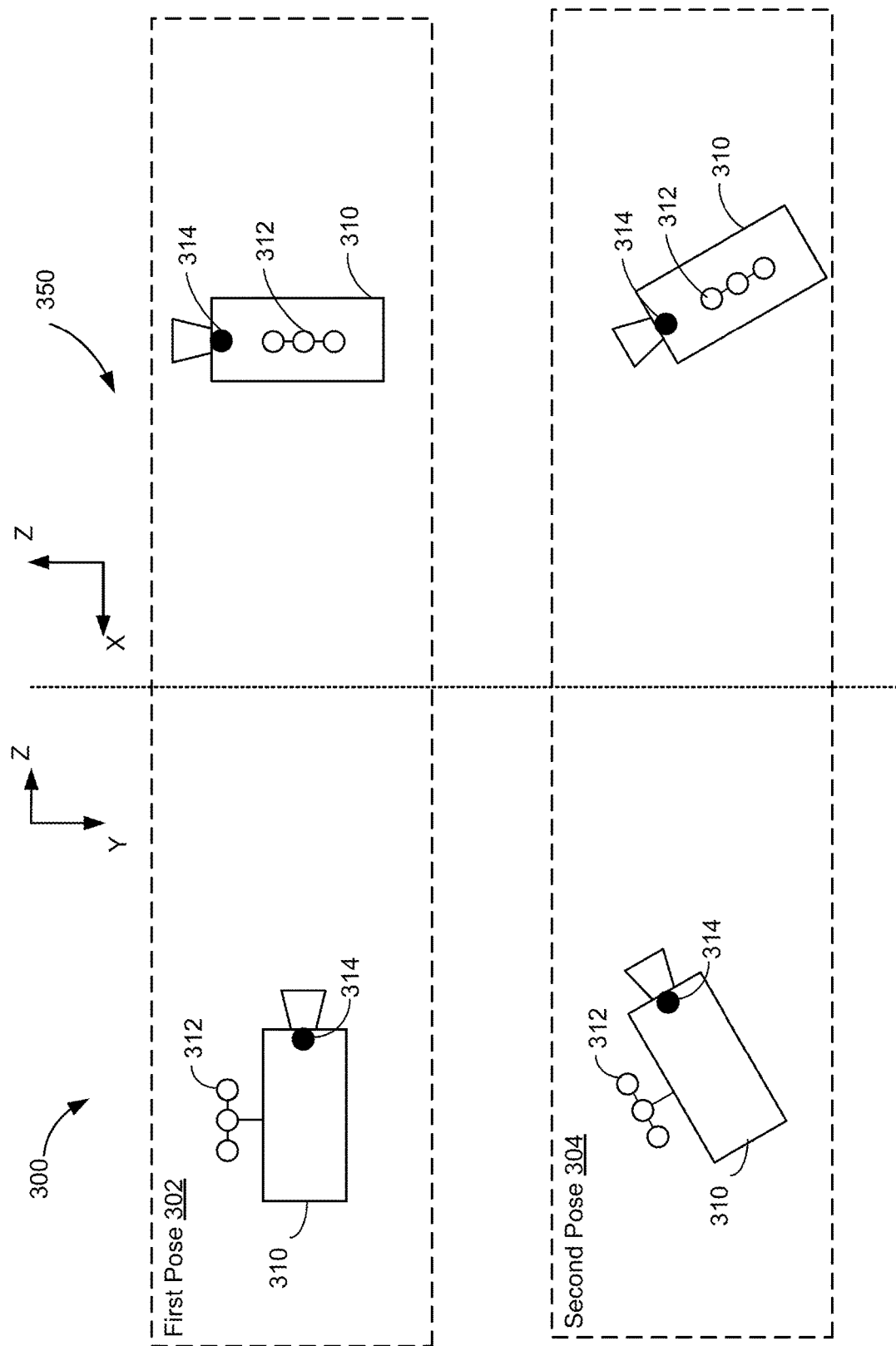
FIG. 3 illustrates an example of tracking errors, in accordance with embodiments of the present disclosure.

FIG. 3 illustrates an example of tracking errors, in accordance with embodiments of the present disclosure. The left-hand side shows a left projection view 300 along the YZ-plane. The right-hand side shows a top projection view 350 along the XZ-plane. A camera device 310 is moved from a first pose 302 to a second pose 304. A marker 312 is attached to the camera device 310 to determine the first pose 302 and the second pose 304. The camera device 310 also includes a focal point 314, where poses of the focal point 314 can be used for content rendering synchronization. The camera device 310 and the marker 312 are examples of the camera device 210 and the marker 212, respectively, of FIG. 2.

As illustrated in the left projection view 300, when the camera device 310 is moved to the second pose 304 from the first pose 302, the marker 312 has moved down, whereas the focal point 314 has moved up. As also illustrated in the top projection view 350, when the camera device 310 is moved to the second pose 304 from the first pose 302, the marker 312 has moved to the right, whereas the focal point 314 has moved to the left.

Accordingly, if the marker's 312 poses are used to track the motion of the camera device 310 without accounting for the offset between the marker 312 (e.g., a tracking point thereon) and the focal point 314, pose errors exist. For instance, referring back to the two poses (first pose 302 and second pose 304), the camera device's 310 would be assumed to have moved down and to the right. However, its focal point 314 has actually moved up and to the left. Thus, a video stream synchronization process would incorrectly determine a down-right motion, when in fact an up-right motion should have been determined instead and used for synchronizing the rendering of content with the video stream of the content captured by the camera device 310. Such differences cause unrealistic rendering of the background content on the screen, which can disrupt a viewer's experience. The pose errors can be reduced, or even eliminated, by determining the poses of the marker 312 and transforming them into poses of the focal point 314 based on an offset between the marker 312 and the focal point 314.

Challenges exist with respect to determining an offset between a focal point of a camera device and a marker attached to the camera device. Typically, the focal point is not marked on the camera device (because it generally is inside the camera device). Further, the marker positioning is not predefined and can be flexible. For example, different types or configurations of markers can be used (e.g., having different emitting points, different sizes, etc.). Once the marker is selected, its attachment to the camera device can involve a quick mounting mechanism. Or, in the case of using CV technology to detect and use a set of features on a surface of the camera device as the marker, the set of features may not be predefined. It may be possible to use tools (e.g., ruler, protractor, etc.) to measure an offset between the focal point and the marker. However, these measurements may not be accurate enough (especially given that the focal point is not marked or otherwise identified on the camera device). Instead, and as further described herein next, the offset can be determined based on a camera model of the camera device. A camera calibration procedure can be used to determine any or all of the extrinsic parameters, intrinsic parameters, and a distortion model of the camera model.

Figure 4:
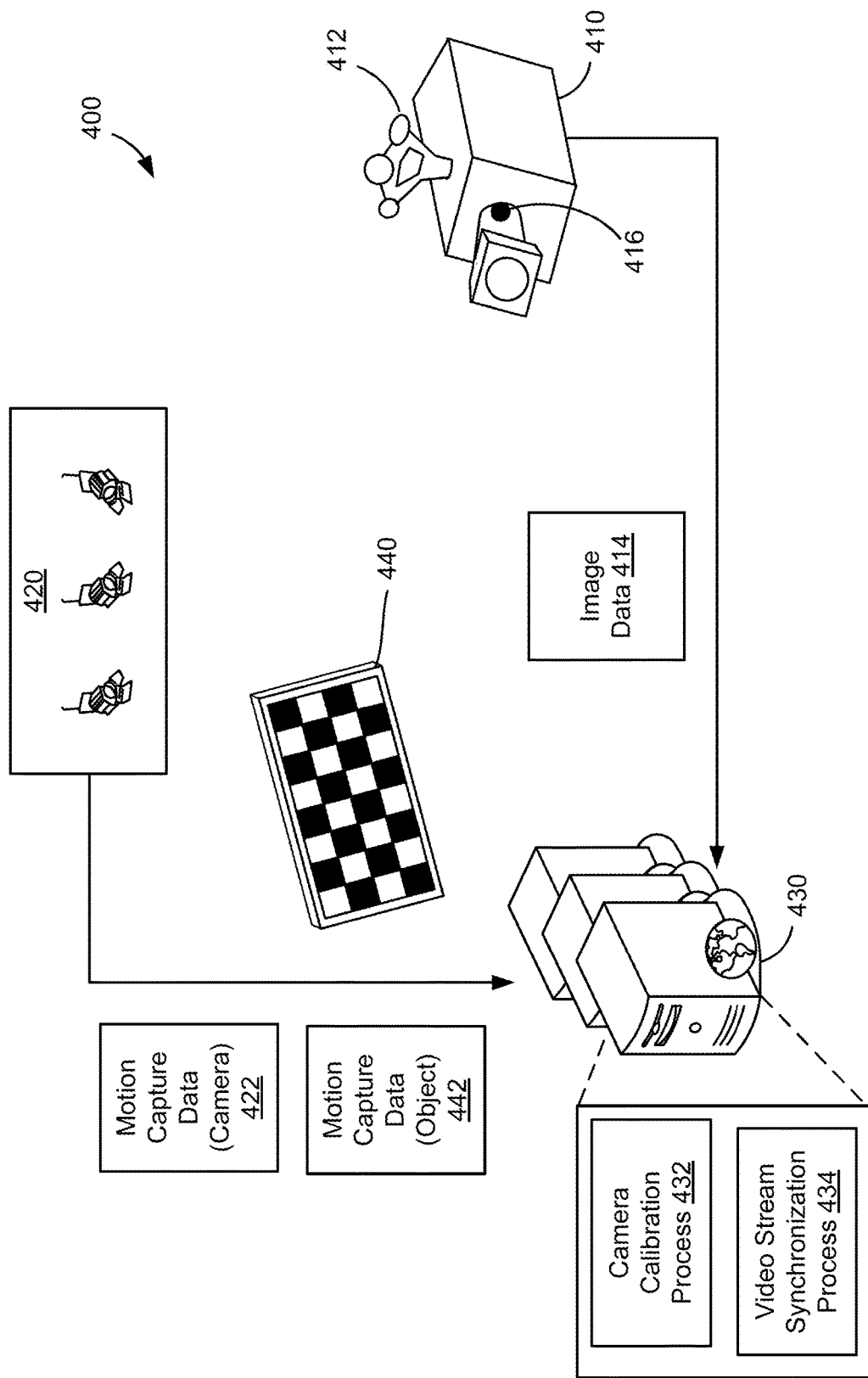
FIG. 4 illustrates an example of a camera calibration system configured to determine a focal point of a camera device, in accordance with embodiments of the present disclosure.

FIG. 4 illustrates an example of a camera calibration system 400 configured to determine a focal point of a camera device 410, in accordance with embodiments of the present disclosure. The camera calibration system 400 includes a motion capture system comprising motion capture devices 420, a computer system 430, and an object 440. The camera calibration system 400 performs a camera calibration procedure by, at least in part, processing motion capture data 442 generated by the motion capture system and image data 414 generated by the camera device 410. A marker (not shown) can be attached to the object 440 to track its motion by the motion capture system. The motion capture data 442 indicates the motion of the object 440 over time, whereas the image data 414 includes images showing poses of the object 440 (e.g., representing a video stream of the object's 440 motion). The processing can be performed by a camera calibration process 432 executing on the computer system 430 that receives the motion capture data 442 and the image data 414 to then calibrate a camera model of the camera device 410. The camera device 410, the motion capture devices 420, and the computer system 430 are examples of the camera device 210, the motion capture devices 220, and the computer system 230, respectively, of FIG. 2.

A marker 412 can be attached to the camera device 410 to track the motion of the camera device 410 before the start of the camera calibration procedure, during this procedure, or after its completion. The marker 412 is an example of the marker 212 of FIG. 2.

In an example, the camera device 410 remains static (e.g., is not moved) during the camera calibration procedure. In this case, the marker 412 need not be attached until after the completion of the camera calibration procedure or, if attached, may not be used. Upon completion of the camera calibration procedure, the object 440 may be removed and no longer used. The camera calibration process 432 can output an indication of a focal point 416 of the camera device 410 based on the calibrated camera model (e.g., the position and/or rotation of the focal point 416 in a coordinate system, such as the coordinate system of the camera device 410 if the marker 412 is not used, or in the coordinate system of the motion capture system if the marker 412).

Thereafter, the camera device 410 can be moved, resulting in a change to the poses of its focal point 416. The marker 412 may be attached (if not already) to the camera device 410 and an offset to the focal point 416 estimated such that the motion (e.g., sequence of poses) of the focal point 416 can be determined by tracking the motion of the marker 412. In particular, the motion capture system generates motion capture data 422 that indicates poses of the marker 412 over time. The camera calibration process 432 can receive the motion capture data 422, determine a pose of the camera device 410 using a determined pose of the marker 412 (e.g., from each video frame captured in the motion capture data 422), and determine the offset between the marker 412 (e.g., a tracking point thereon) and the focal point 416. The offset can be output to a video stream synchronization process 434 executing on the computer system. Based on the motion capture data 422 and the offset, the video stream synchronization process 434 determines the motion (e.g., poses) of the focal point 416 by translating and/or rotating, as applicable, the motion (e.g., poses) of the marker 412. The video stream synchronization process 434 can then synchronize, based on the motion of the focal point 416, content rendering with a video stream captured by the camera device 410.

It may be sufficient to determine the offset once (e.g., based on the initial pose of the marker 412, where this initial pose can correspond to the pose of the camera device 410 during the camera calibration procedure). However, it may be possible to determine an offset each time the pose of the marker 412 changes or at some predefined rate. The predefined rate can relate to the FPS rate used by the motion capture system and/or the camera device. For instance, the predefined rate can be every one second, corresponding to one-hundred forty-four motion capture frames when a 144 FPS motion capture rate is used. Or the predefined rate can be every forty milliseconds, corresponding to about twenty-four video frames when a 24 FPS video frame rate is used, for instance.

Referring back to the system 100 of FIG. 1 and the camera calibration system 400 of FIG. 4, the same motion capture system used in a virtual production can also be used to calibrate a camera device (e.g., the camera device 120 or 410). Prior to starting the virtual production or filming a scene, the object 440 can be placed in the volume and the calibration procedure can be performed. Thereafter, the object 440 is removed and the virtual production can start and/or the scene can be filmed by using the camera device and adjusting the content 112 according to the motion of the focal point 416.

In FIG. 4, the object 440 is moved while the camera device 410 remains stationary during the camera calibration procedure. However, the embodiments of the present disclosure are not limited as such. Instead, the camera device 410 can additionally or alternatively be movable. For instance, the object 440 can remain stationary, whereas the camera device is moved. In this case, the motion capture data 422 of the camera device 410, rather than the motion capture data 442 of the object 440, is used by the camera calibration process 432 to calibrate the camera model. In another illustration, the object 440 and the camera device 410 are moved during the camera calibration procedure and the camera calibration process 432 uses both the motion capture data 422 and the motion capture data 442 in the calibration.

As described herein above, the offset can be determined once or can be determined repeatedly based on a change to a pose. The change to the pose can be an actual observed change or can be a predicted change (e.g., a change expected to occur with a likelihood over a predefined likelihood threshold). By predicting the change, the offset can be pre-computed before the actual observed pose, thereby reducing the latency associated with when the offset can be determined and available for use by the video stream synchronization process 434. Furthermore, and in both cases (e.g., offset computed once or repeatedly computed), the video stream synchronization process 434 can compute a transformation to use in the rendering of content, where the transformation can be computed based on the offset. To reduce the latency associated with rendering the content, the video stream synchronization process 434 can be configured for predictive processing. For instance, the computer system 430 can store (e.g., in a memory thereof) a history of the camera device's 410 motion. The video stream synchronization process 434 can perform an extrapolation on the history data to predict a next set of poses (e.g., future motion) of the camera device 410. This prediction can also be based on scene data (which can be stored by in the memory too) that indicates a sequence of events in a scene (e.g., choreography data). Given the prediction, the video stream synchronization process 434 can predict needed transformations (e.g., based on the offset) to render the content. By doing so, the latency between an actual pose and the adjustment of the content rendering can be reduced. Additionally or alternatively to extrapolating based on the motion history, the computer system 140 can store (e.g., in the memory) a history of transformations, and the video stream synchronization process 434 can predict the next set of transformations before the actual next set of poses are observed, where this prediction can involve an extrapolation of the history of transformations.

Figure 5:
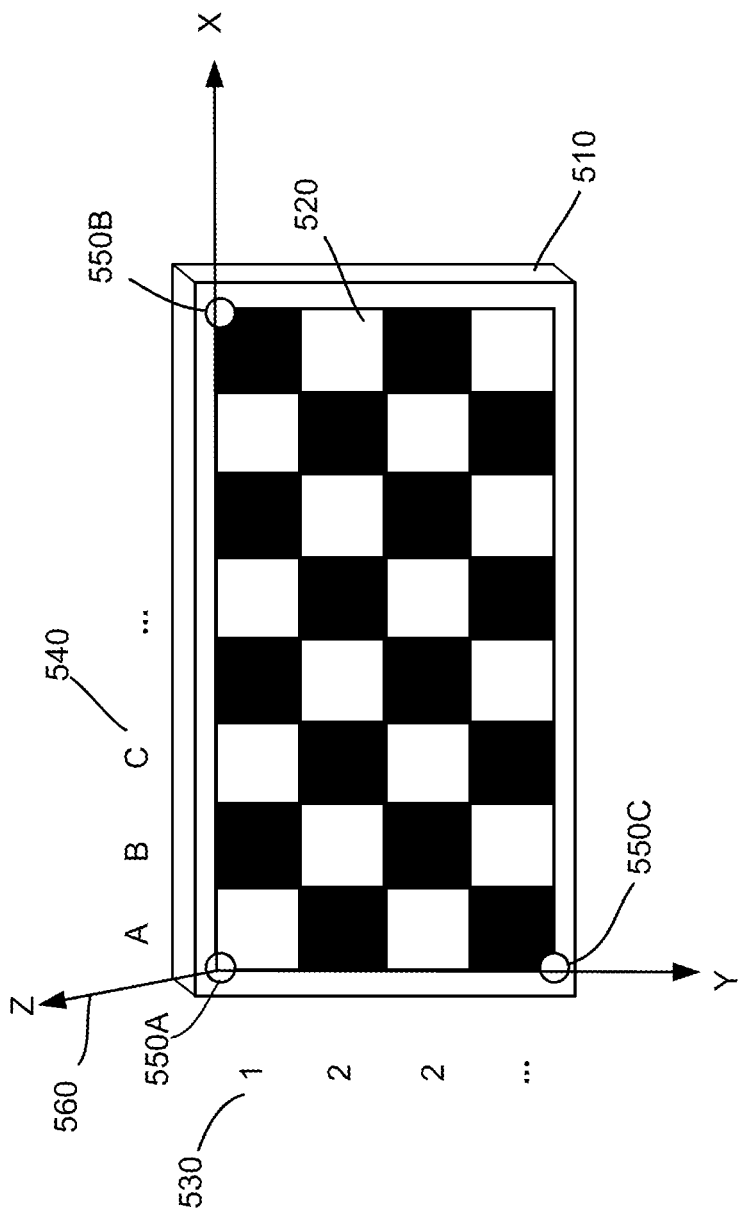
FIG. 5 illustrates an example of an object usable in a camera calibration procedure, in accordance with embodiments of the present disclosure.

FIG. 5 illustrates an example of an object 510 usable in a camera calibration procedure, in accordance with embodiments of the present disclosure. The object 510 is an example of the object 440 of FIG. 4. Generally, the object 510 includes a surface on which a pattern 520 of features appears, where this surface with the pattern 520 can be imaged by a camera device. The pattern 520 can be indexed (shown in FIG. 3, with a row index 530 using numbers and a column index 540 using letters, although other types of indexing is possible and can depend on the pattern 520). A marker is attached to the surface such that poses of the object 510 can be tracked over time. In the illustration of FIG. 5, the marker includes three individual makers (e.g., IR emitting points, recognizable markers, etc.) 550A, 550B, and 550C, located at different corners of the pattern 520 (although a different number of individual makers and/or distribution of such markers is possible). A local coordinate system 560 (e.g., a cartesian coordinate system, etc.) can be defined for the object 510 and an origin of this coordinate system can be set to a point on the surface (e.g., the origin is a root rigid point). In the illustration of FIG. 5, the origin is set to the top left corner of the pattern 520 and corresponds to center of the individual marker 550A (although a different point can be used for the origin, such as the center of the pattern 520).

The object 510 may have different shapes and/or dimensions. Generally, the object 510 is large enough to have a pattern 520 that can be accurately detected by an implementation of image processing algorithm, yet small enough such that the object 510 can be easily moved. The surface of the object 510 can be planar (e.g., flat) or non-planar (e.g., curved). The pattern 520 can be a chessboard-like pattern, although other patterns are possible. In the chessboard pattern, the features can be a set of corners of rectangles having particular colors (e.g., black and white) and can be SIFT features, SURF features, ORB features, etc. of computer vision algorithms. Other configurations (e.g., shape, color, etc.) of the features are possible. Generally, the feature needs to be detectable based on an implementation of an imaging processing algorithm (e.g., an OpenCV algorithm). For accurate detection and processing, a size of a pattern (e.g., its cross section) needs to be substantially the same or comparable to the size of a marker (e.g., the cross section of an individual emitting point) attached to the camera device that is being calibrated. Substantially the same or comparable means that the difference between the two sizes is within a predefined size margin of each other (e.g., +/−10 percent). For instance, the cross-section of the marker is within a range of 200 to 300 millimeters (mm), whereas the size of the pattern is 215.9 mm by 279.4 mm.

A virtual object (e.g., a three-dimensional object) can model the object 510 and can include virtual representations of the pattern 520 and the features. For instance, the pattern 520 can be represented as a mesh and each feature can be represented as a mesh point having a position defined in the local coordinate system 560 as: $X_{ij}$=I×cell_size, $Y_{ij}$=J× cell_size, and, in the case of a planar surface, $Z_{ij}$=0, where "I" corresponds to the column index 540 and "J" corresponds to the row index 530. The mesh (e.g., a virtual representation of the pattern 520) can be used to project the object 510 to an image plane based on a detected pose of the object 510. The mesh points (e.g., virtual representation of the features) can be used to determine projection errors of the projection.

Figure 6:
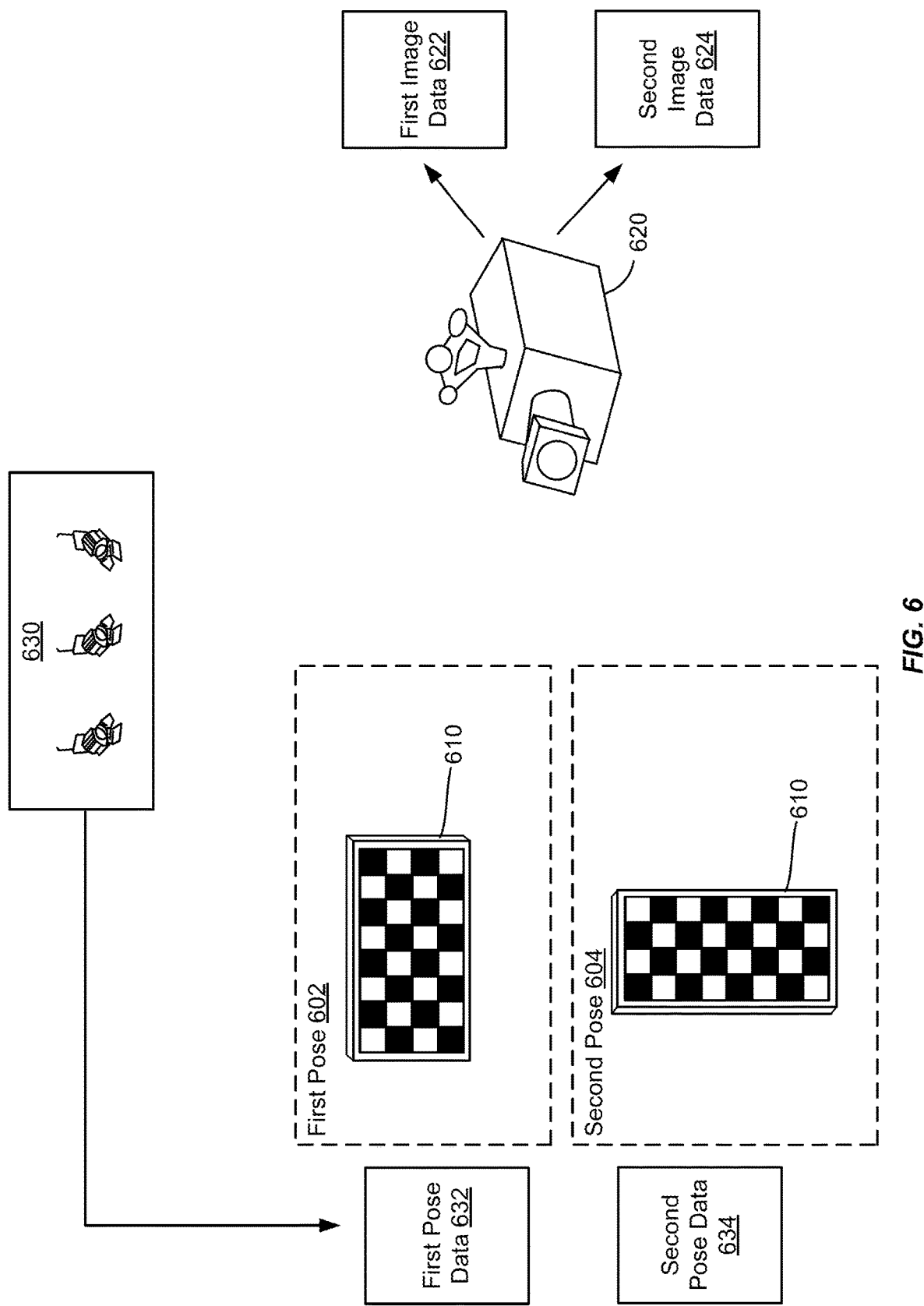
FIG. 6 illustrates an example of generating pose data and image data of an object during a camera calibration procedure, in accordance with embodiments of the present disclosure.

FIG. 6 illustrates an example of generating pose data and image data of an object 610 during a camera calibration procedure, in accordance with embodiments of the present disclosure. As explained in connection with FIG. 4, in addition to the object 610, the camera calibration procedure involves a camera device 620 and a motion capture system that includes motion capture devices 630. In the illustration of FIG. 6, during the camera calibration procedure, the object 610 is movable, while the camera device 620 remains static. The motion capture system is used to generate motion capture data of the object 610, showing the motion of the object 610 over time. The camera device 620 generates image data that represents a video stream of the motion. The motion capture frame rate and the video frame rate can be different. For instance, a 144 FPS motion capture frame rate and a 24 FPS video capture frame rate can be used. Poses indicated by the motion capture data can be associated with images (e.g., video frames) based on timing as further illustrated in FIG. 7.

As illustrated in FIG. 6, the object 610 is placed in a first pose 602 for a certain amount of time (e.g., a half a second time window, or some other length of a time window). While in the first pose 602, first motion capture data 632 is generated by the motion capture system at the motion capture frame rate and indicates the first pose 602. While also in the first pose 602, first image data 622 is generated by the camera device 620 at the view frame rate and shows the object 610 in the first pose 602.

The object 610 is then moved to a second pose 604. It may take a certain amount of time (e.g., a few milliseconds, such as 50 ms, etc.) for the object to be placed in the second pose 604. During this time, motion capture data and image data may still be generated. However, as explained in connection with FIG. 7, these motion capture data and image data can be identified and discarded.

The object 610 remains in the second pose 604 for a certain amount of time (e.g., another half a second time window or some other length of a time window) before being moved into the next pose. While in the second pose 604, second motion capture data 634 is generated by the motion capture system at the motion capture frame rate and indicates the second pose 604. While also in the second pose 604, second image data 624 is generated by the camera device 620 at the video frame rate and shows the object 610 in the second pose 604.

The above process of moving the object 610 to a different pose after every time window (e.g., every half a second) can be repeated to generate motion capture data indicating the poses of the object 610 over time and image data representing a video stream that shows these poses. In an example, it may be sufficient to determine a minimum number of poses of the object 610 (e.g., about four poses) to calibrate the camera device 620. However, a larger number of poses (e.g., in a range of thirty to sixty, or more) can improve the accuracy of the camera calibration.

Moving the object 610 can be performed by an operator. The operator can be a human. Alternatively, the operator can be a robot system. For instance, the robot system can include a movable body (e.g., a body mounted on wheels) that comprise a controller (e.g., a set of processors) and a memory, a robotic arm that extends from the movable body and that can be controlled by the controller, and an end effector also controllable by the controller and having one end permanently attached to the robotic arm and another end releasably attached to the object 610. The memory can store instructions executed by the processor(s) to control the robotic arm and the end effector. The memory can further store a motion path for controlling the robotic arm and the end effector, where this motion path indicates a sequence of poses in which the object 610 is to be placed.

As indicated herein above, a pose indicated by a portion of the motion capture data can be associated with an image indicated by a portion of the image data. The association can be based on timing (e.g., the timing of the pose matches the timing of the image). However, other types of associations can be used. For instance, a visual association is possible. In particular, and referring back to the robot system, the motion path can include an identifier of each pose. The robot system can also include a display that presents the identifier of each pose. When imaging the poses, the camera device 620 generates images, where each image not only shows the object 610 in a particular pose, but also shows the identifier of the pose as presented on the display. As such, each image is associated with a corresponding pose, where the poses are identified in the motion path.

Figure 7:
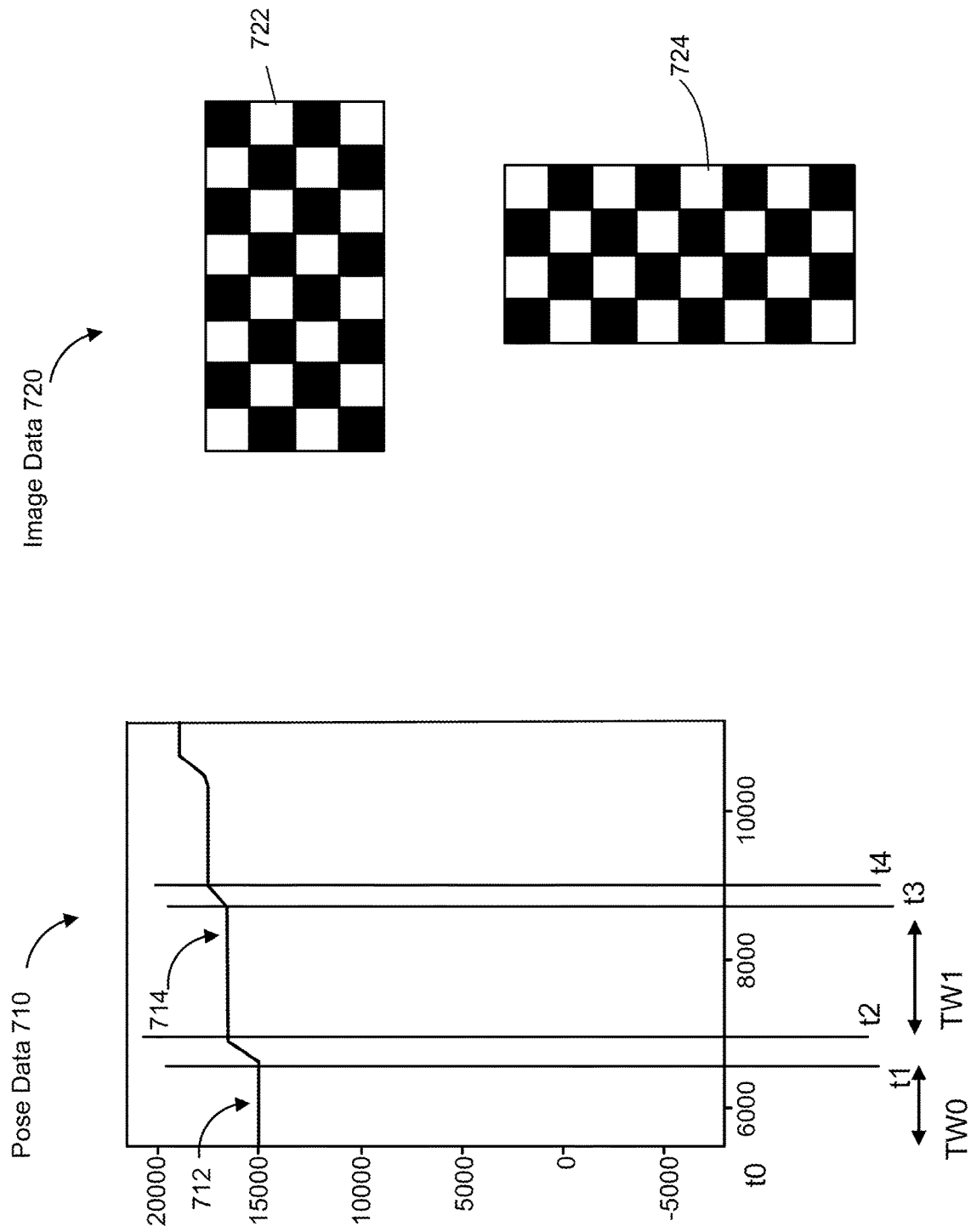
FIG. 7 illustrates an example of pose data and image data associated with an object, in accordance with embodiments of the present disclosure.

FIG. 7 illustrates an example of pose data 710 and image data 720 associated with an object, in accordance with embodiments of the present disclosure. The pose data 710 can include motion capture data generated by a motion capture system (e.g., as described in connection with FIGS. 4 and 6). Generally, the pose data 710 indicates poses of the object over time, where the sequence of the poses represent a motion of the object. A pose can be defined as a position and a rotation in a coordinate system (e.g., in a coordinate system of a motion capture system). As such, the portion of the pose data 710 corresponding to the pose can indicate the position and the rotation by including x, y, and z coordinates and x, y, z rotations (although a non-Cartesian coordinate system can be used). The image data 720 can include images generated by a camera device, where the sequence of images shows the motion of the object over time.

In the interest of clarity, a plot of the x coordinates having values available from the pose data 710 is shown in FIG. 7. The horizontal axis of the plot corresponds to time, and the vertical axis corresponds to the values. However, the y and z coordinates and the x, y, and z rotations can be similarly plotted. The pose data 710 changes over time. The magnitude or slope of the change can indicate a pose or a transition into a next pose. For instance, two x coordinates (or averages of two sets of x coordinates) can be compared to determine a change to the x coordinates (e.g., a change to a slope of a line that connects the x coordinates). If the change is smaller than a threshold value, then the x coordinates have not substantially changed indicating that the object is still in a same pose. Otherwise, the x coordinates have substantially changed indicating that the object was moved into the next pose.

Referring to the plot of FIG. 7, during a first time window "TW0" (e.g., a 500 ms time window) defined by a start time "t0" and an end time "t1", the corresponding x coordinates 712 did not significantly change indicating that the object was in the first pose between the times "t0" and "t1." During a transition time window starting at time "t1" and ending at time "t2" (e.g., about a 50 ms time window), a substantial change occurs, indicating a transition to a next, second pose. During a second time window "TW1" (e.g., a 500 ms time window) defined by a start time "t2" and an end time "t3", the corresponding x coordinates 716 did not significantly change indicating that the object was in the second pose between the times "t2" and "t3." During a transition time window starting at time "t3" and ending at time "t4" (e.g., about a 50 ms time window), a substantial change occurs, indicating a transition to a next, third pose.

The first pose is associated with the first time window "TW0." To determine the x coordinate of the first pose, some or all of the x coordinates 712 that belong first time window "TW0" can be used. In particular, a statistical measure (e.g., an averaging function) can be applied to relevant x coordinates 712 to compute the first pose's x coordinate. This type of computation can be repeated across the different time windows and across the z and y axes to determine the different poses.

The image data 720 includes images (e.g., first image 722 and second image 724) corresponding to the poses. For instance, a first image 722 corresponds to the first pose, whereas a second image 724 corresponds to the second pose. Of course, the number of images per pose can depend on the video frame rate and on how long the object remained in the pose (e.g., the time length of each time window "TW0," "TW1," etc.). If more than one image is available for a pose, a single image (or a subset of these images) can be selected randomly for further processing.

Figure 8:
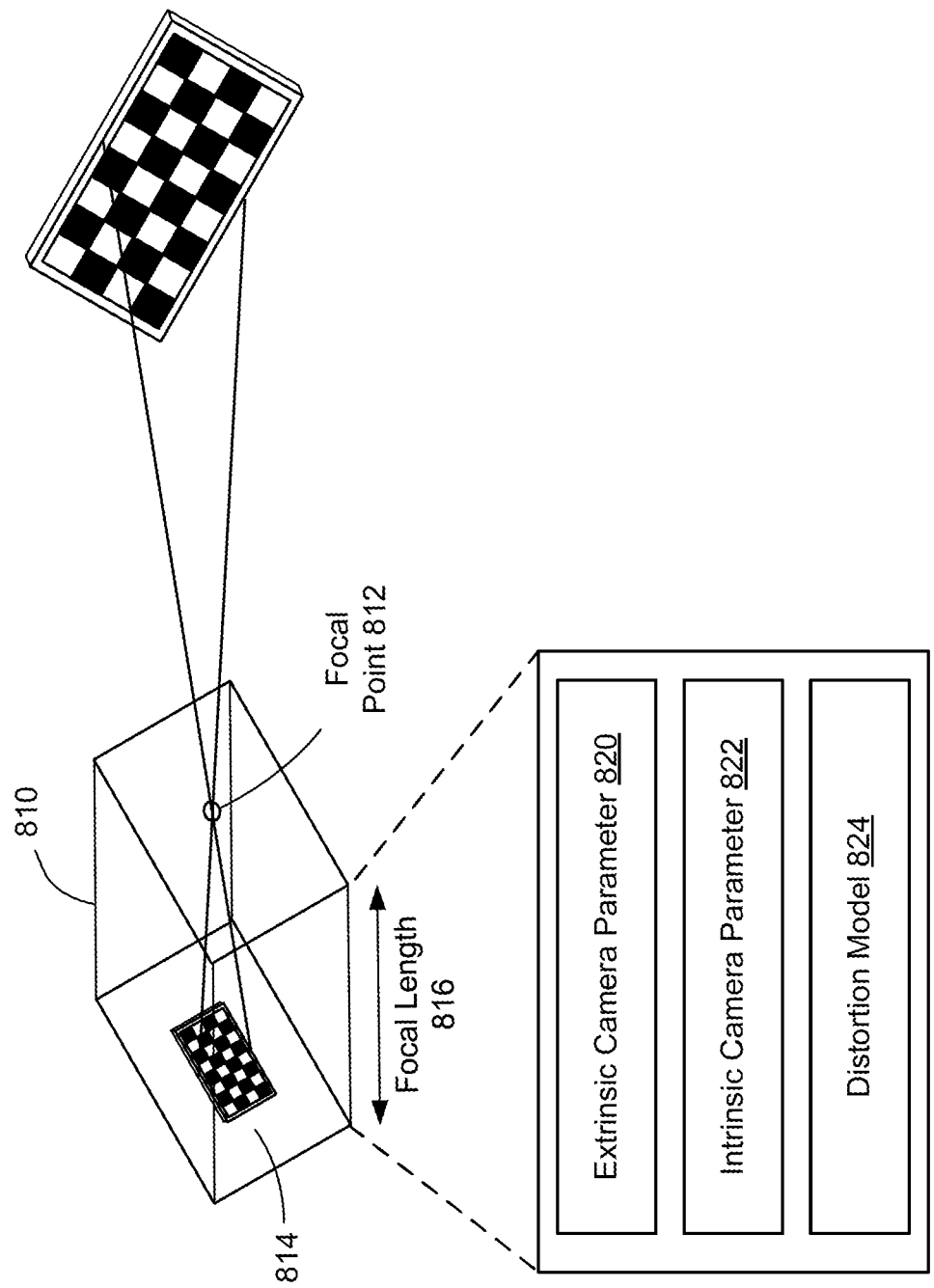
FIG. 8 illustrates an example of a camera model determined based on a camera calibration procedure, in accordance with embodiments of the present disclosure.

FIG. 8 illustrates an example of a camera model 810 determined based on a camera calibration procedure, in accordance with embodiments of the present disclosure. The camera model 810 includes a focal point 812 and an image plane 814 separated by a distance that represents a focal length 816. The focal point 812 can be center of an aperture through which light rays from an object 850 pass and are projected as an inverted image on the image plane 814.

The camera model 810 can characterize the corresponding camera device by including extrinsic camera parameters 820, intrinsic camera parameters 822, and a distortion model 824. The extrinsic camera parameters 820 represent the location of the camera device in a real-world space. This location can correspond to a pose of the focal point 812. The intrinsic camera parameters 822 represent the optical center and focal length of the camera. For instance, the intrinsic camera parameters 822 include the focal length 816 and the optical center, also known as the principal point, and can be expressed as a camera matrix:

$$\begin{bmatrix} f_x & 0 & c_x \\ 0 & f_y & c_y \\ 0 & 0 & 1 \end{bmatrix},$$

where "f" represents the focal length 816 along the X, Y, and Z axes and "c" represents the optical center along the X, Y, and Z axes. A skew coefficient "s" can also be included in the camera matrix when, for instance, the image axes are not perpendicular (the axes form an acute angle "β" (e.g., a pixel has a parallelogram shape instead of a square shape). In this case, $s=f_x \tan \alpha$, where "α" is the angle difference between ninety degrees and "β." During rendering, the skew coefficient "s" can be used in a de-skewing operation such that a rendered pixel is adjusted to have perpendicular axes (e.g., to have a square shape). The extrinsic camera parameters 820 represent a rigid transformation from a three-dimensional coordinate system of the real-world space (e.g., the one used by a motion capture system) to a three-dimensional coordinate system local to the camera device. The intrinsic camera parameters 822 represent a projective transformation from the camera device's three-dimensional coordinates into the two-dimensional image coordinates.

The camera matrix does not account for lens distortion. To accurately represent the camera device, the distortion model 824 includes the radial and tangential lens distortion. Radial distortion occurs when light rays bend more near the edges of a lens than they do at its optical center. The smaller the lens, the greater the distortion. The radial distortion coefficients model this type of distortion. The distorted points are denoted as $(x_{distorted}, y_{distorted})$: $x_{distorted}=x(1+k_1*r^2+k_2*r^4+k_3*r^6)$ and $y_{distorted}=y(1+k_1*r^2+k_2*r^4+k_3*r^6)$, where x, y represent undistorted pixel locations (x and y are in normalized image coordinates.; normalized image coordinates are calculated from pixel coordinates by translating to the optical center and dividing by the focal length in pixels), $k_1$, $k_2$, and $k_3$ represent radial distortion coefficients of the lens, and $r^2=x^2+y^2$.

Tangential distortion occurs when the lens and the image plane are not parallel. The tangential distortion coefficients model this type of distortion. The distorted points are denoted as $(x_{distorted}, y_{distorted})$: $x_{distorted}=x+[2*p_1*x*y+p_2*(r^2+2*x^2)]$ and $y_{distorted}=y+[p_1*(r^2+2*y^2)+2*p_2*x*y]$, where x, y also represent undistorted pixel locations, $p_1$ and $p_2$ are tangential distortion coefficients of the lens, and $r^2$ is also equal to $x^2+y^2$.

As further described in the next figures, each of the extrinsic camera parameters 820, the intrinsic camera parameters 822, and the distortion model 824 can be determined based on a camera calibration procedure. Alternatively, the intrinsic camera parameters 822 and/or the distortion model 824 can be predefined (e.g., data available from a manufacturer of the camera device or a third party and defined for a device model, or device serial number, etc.). If the intrinsic camera parameters 822 or the distortion model 824 are available, the camera calibration procedure may only determine the extrinsic camera parameters 820 without updating the predefined intrinsic camera parameters 822 and/or distortion model 824 (as applicable). In this case, alternatively, the camera calibration procedure may initialize the camera model 810 to use the predefined intrinsic camera parameters 822 and/or distortion model 824 (as applicable) and then update the predefined intrinsic camera parameters 822 and/or the distortion model 824 in addition to determining the extrinsic camera parameters 820.

Figure 9:
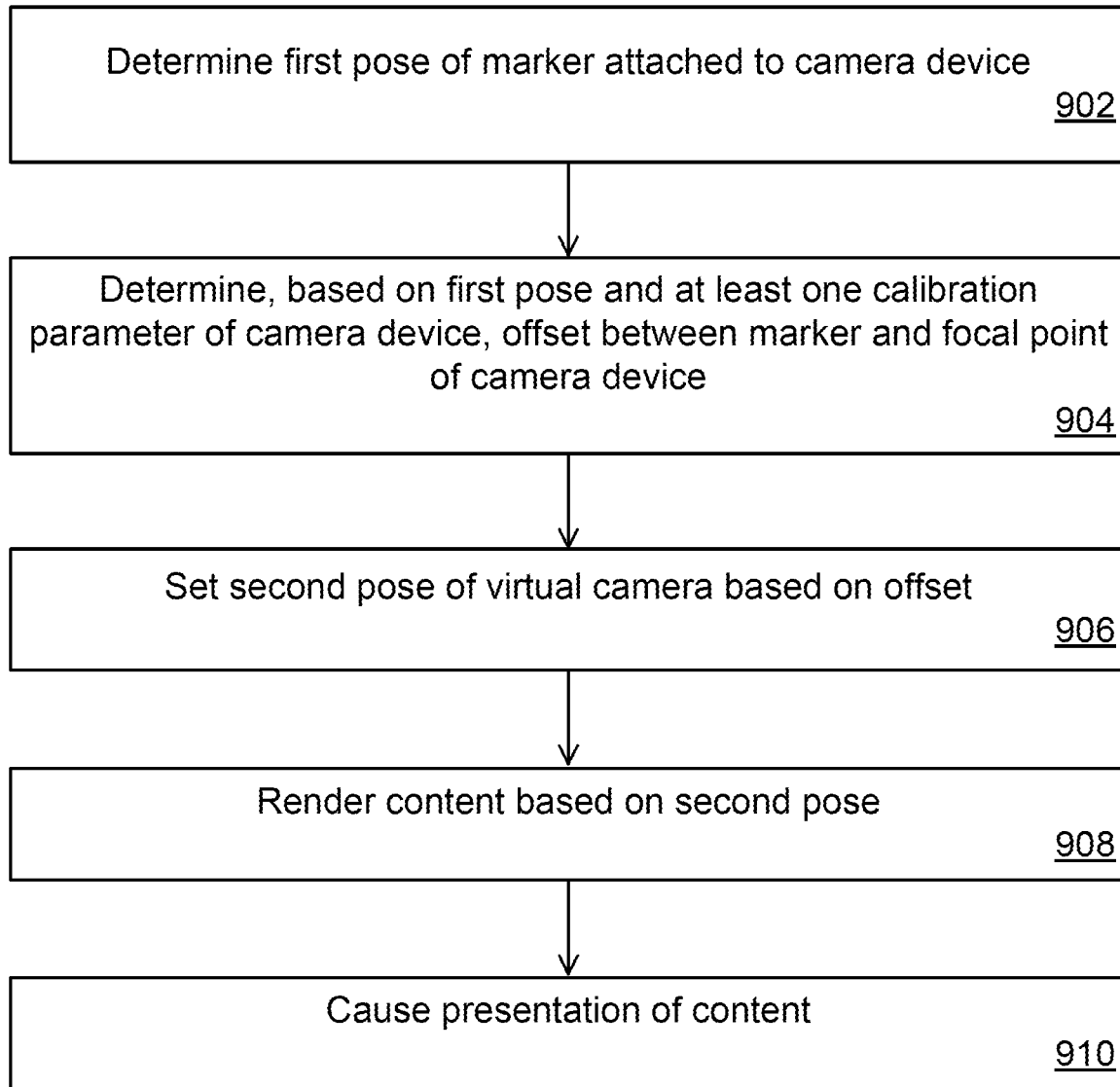
FIG. 9 illustrates an example of a flow for rendering content based on a determination of a focal point of a camera device, in accordance with embodiments of the present disclosure.
Figure 10:
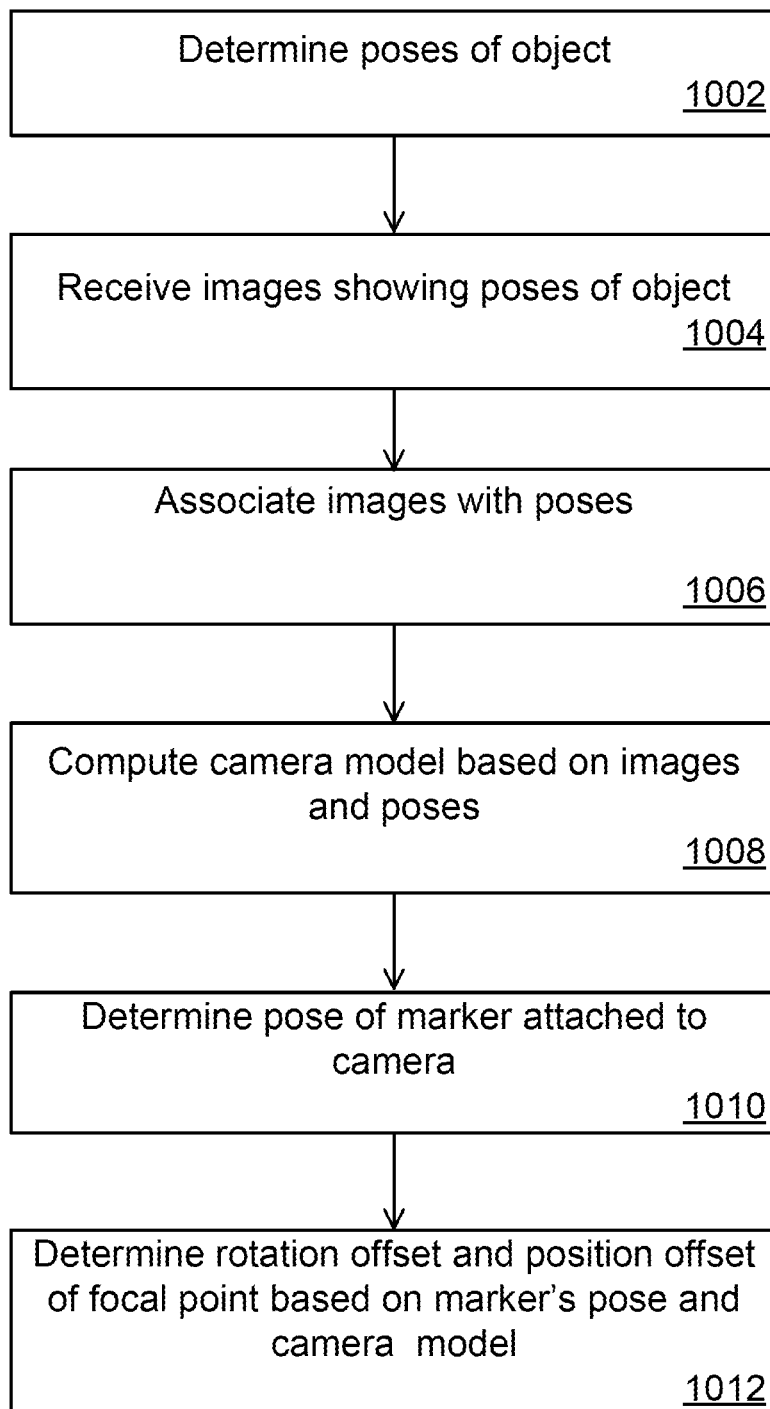
FIG. 10 illustrates an example of a flow for determining an offset between a focal point of a camera device and a marker attached to the camera device, in accordance with embodiments of the present disclosure.
Figure 11:
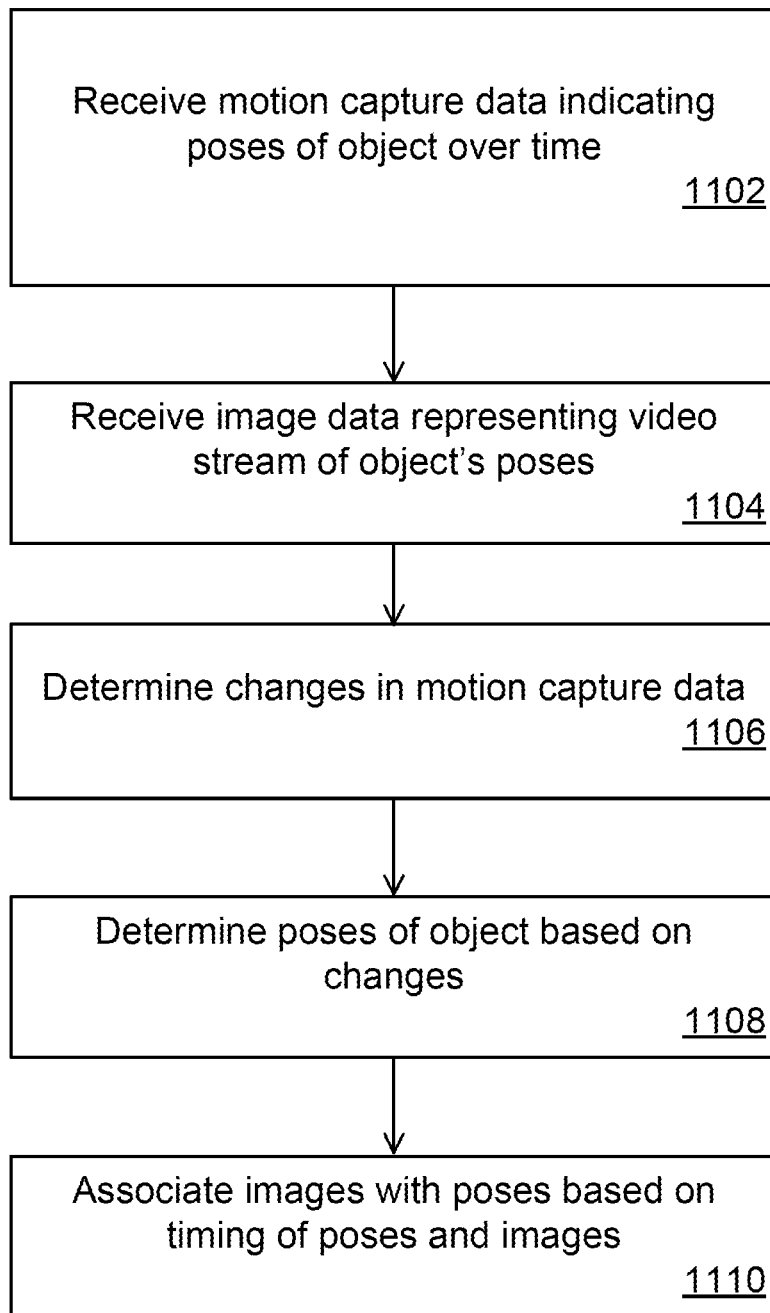
FIG. 11 illustrates an example of a flow for associating pose data with image data in a camera calibration procedure, in accordance with embodiments of the present disclosure.

FIGS. 9-11 describe flows related to determining and using one or more poses of a focal point of a camera device. Operations of the flows can be performed by a computer system, such as the computer system 140 or 430. Some or all of the instructions for performing the operations can be implemented as hardware circuitry and/or stored as computer-readable instructions on a non-transitory computer-readable medium of the computer system. As implemented, the instructions represent components that include circuitry or code executable by processor(s) of the computer system. The use of such instructions configures the computer system to perform the specific operations described herein. Each circuitry or code in combination with the relevant processor(s) represents a means for performing a respective operation(s). While the operations are illustrated in a particular order, it should be understood that no particular order is necessary and that one or more operations may be omitted, skipped, performed in parallel, and/or reordered.

FIG. 9 illustrates an example of a flow for rendering content based on a determination of the focal point of the camera device, in accordance with embodiments of the present disclosure. The flow may start at operation 902, where the computer system determines a first pose of a marker attached to the camera device. In an example, the computer system receives pose data over time, such as motion capture data generated by a motion capture system, where the pose data indicates the motion of the marker and is defined for a tracking point on the marker (e.g., a rigid body point thereof). A portion of the pose data can have a time stamp that corresponds to the time at which the camera device was in the first pose in a real-world space. That portion of the pose data can include x, y, and z coordinates and x, y, and z rotations that indicate the position and the rotation of the marker in a coordinate system (e.g., the coordinate system of the motion capture system).

At operation 904, the computer system determines, based on the first pose and at least one calibration parameter of the camera device, an offset between the marker and a focal point of the camera device. In an example, the camera device is associated with a camera model that includes the at least one calibration parameter as, for instance, one or more extrinsic camera parameters and/or one more intrinsic camera parameters. The extrinsic camera parameter(s) can locate the focal point in a coordinate system of the camera device. The intrinsic camera parameter(s) can indicate an image plane parallel to a plane that contains the focal point and can also indicate a focal length between the image plane and the focal point. Based on the extrinsic camera parameter(s) and the intrinsic camera parameter(s), a position offset and a rotation offset are computed from the position and the rotation of the marker (e.g., its tracking point). The position offset and the rotation offset form the offset between the marker and the focal point. The camera model can be predefined or can be determined in part or in full based on a camera calibration procedure.

At operation 906, the computer system sets a second pose of a virtual camera based on the offset. The virtual camera can be a virtual representation of the camera device in a virtual space, where the virtual space is, in turn, a virtual representation of the real-world space. In an example, the pose of the focal point in the coordinate system of the real-world space (the coordinate system of the motion capture system in which the first pose is determined) is determined by translating the position of the marker by the position offset and by rotating the rotation of the marker by the rotation offset. The focal point's pose can be expressed as a position and rotation of the marker in the coordinate system. Given a mapping between the coordinate system of the real-world space and a coordinate system of the virtual space, the focal point's position and rotation are mapped to a virtual position and a virtual rotation in the virtual space. The virtual position and the virtual rotation define the second pose of the virtual camera.

At operation 908, the computer system renders content based on the second pose. For example, the computer system synthesizes images and/or image frames (two-dimensional or three-dimensional) to generate the content. The synthesization can apply transformations (e.g., skewing, angling, distorting, etc.) given the second pose such that, upon a presentation of the content (e.g., on a display assembly), the content itself and/or the presentation thereof are adjusted to account for the pose of the focal point in the real-world space. In a further example, the camera model can include a distortion model. The rendering can distort the content based on the second pose by using a radial distortion and/or a tangential distortion (or inverse(s) thereof) such that to give a special effect to the content's presentation given the focal point's pose in the real-world space. For instance, the display assembly is modeled as a virtual display in the virtual space. The computer system determines a virtual display area (e.g., the entire virtual display or a portion thereof) based on the second pose (e.g., the virtual display area that is in the field of view of the virtual camera given the second pose). The computer system also determines a portion of the content that is associated with the virtual display area (e.g., that will be displayed in the display area of the display assembly corresponding to the virtual display area). The computer system then distorts the portion of the content based on the distortion model (e.g., by using the radial distortion, the tangential distortion, inverse(s) thereof, etc.).

At operation 910, the computer system causes a presentation of the content. For example, the computer system outputs the content to the display assembly, where the display assembly presents the content. Upon the presentation of the content, the camera device can generate a video stream that shows the content.

The flow of FIG. 9 is described in connection with a single pose of the camera device. Some or all of the operations of the flow can be repeated for different poses of the camera device, where the sequence of poses corresponds to a motion of the camera device. For instance, the offset may be determined once and re-used or can be computed upon a change to the marker's pose. In both cases, the second pose of the focal point can be updated given the latest pose of the marker. The updated pose can be used to update the rendering of the content.

FIG. 10 illustrates an example of a flow for determining the offset between the focal point of the camera device and the marker attached to the camera device, in accordance with embodiments of the present disclosure. The offset can be determined concurrently with performing the camera calibration procedure. Operations of the flow of FIG. 10 can be implemented as sub-operations of the flow of FIG. 9. In an example, the flow of FIG. 10 may start at operation 1002, where the computer system determines poses of an object. The sequence of poses represents a motion of the object over time. In an example, the computer system receives pose data that indicates the poses, such as motion capture data that is generated by the motion capture system and that tracks a marker attached to the object. Given changes in the pose data, the computer system can determine the poses.

At operation 1004, the computer system receives images showing the poses. For example, the images are generated by the camera device, represent a video stream that shows the object's motion, and are received as image data (e.g., video frames) from the camera device.

At operation 1006, the computer system associates the images with the poses. For instance, an image that shows a pose of the object is associated with the pose. In an example, the associations can be time-based. In particular, the timing of each image is determined (e.g., as a time stamp of when the image was generated) and matched to a timing of a pose (e.g., to a time window associated with pose data from which the pose is computed; the match can correspond to the time stamp falling between a start time and an end time of the time window). Given the match, the image-to-pose association is established. Other types of associations can additionally or alternatively be used. For instance, referring back to a robot system that moves the object and that displays an identifier of each pose, an image showing a pose can be processed to also detect the pose's identifier displayed by the robot system.

At operation 1008, the computer system computes a camera model based on the images and the poses (and the associations therebetween). For instance, the images and the poses are used in the camera calibration procedure to determine, as applicable, the extrinsic camera parameters, the intrinsic camera parameters, and/or the distortion model. In an example, the camera calibration procedure includes multiple steps.

In a first step, a subset of the images is selected randomly (e.g., a minimum of four or, more typically, in the range of thirty to sixty images, etc.). The visual features on the object (e.g., as formed by the pattern 520 of FIG. 5) are detected on each one of the selected images as two-dimensional coordinates on the image. Any type of two-dimensional features can be used (e.g., SIFT, SURF, ORB, etc.), based on any recognizable pattern (e.g., a chessboard pattern).

In a second step, the correspondences between the three-dimensional features (e.g., their three-dimensional coordinates, in millimeters, in the coordinate system of the motion capture system, referred to herein as a global coordinate system) and two-dimensional features (e.g., their two-dimensional image coordinates, in pixels, in the coordinate system of the images, referred to herein as an image coordinate system) are set up. For example, if a chessboard pattern is used, a position of any chessboard mesh point (e.g., any detectable feature) can be described in the local chessboard pattern coordinate system as: $X_{ij}$=I× cell_size=$Y_{ij}$=J×cell_size, and, in the case of a planar surface, $Z_{ij}$=0, where "I" and "J" are indices of a feature and cell_size is the size of the feature in millimeters.

Next, the camera calibration procedure may be performed on the extracted features. The motion capture data of the recognizable pattern are used as initial values of the extrinsic camera parameters. Each selected image has six extrinsic parameters: three position coordinates and three Rodrigues angles. The intrinsic camera parameters are the same for selected images. Depending on user settings, the number of intrinsic parameters can include focal lengths (in X and Y directions) and the principal point (X and Y image coordinates), and the distortion model can include a number of distortion parameters ("k's" (radial distortions) and "p's" (tangential distortions)) as described herein above.

In an example of a distortion model that involves four distortion parameters (k8–k11, such as in the case of a thin prism model), the following expressions can be used: x"=x'* $(1+k1r^2+k2r^4+k3r^6)/(1+k4r^2+k5r^4+k6r^6)+2p1x'y'+p2*(r^2+2x'^2)$, y"=y'*$(1+k1r^2+k2r^4+k3r^6)/(1+k4r^2+k5r^4+k6r^6)+p1(r^2+2y'^2)+2p2x'y'$, and $r^2=x'^2+y'^2$. x' and y' are normalized projection coordinate (normalized image coordinates) of three-dimensional points of the object. The distortion model can also include the thin prism model distortion. In this case the addition offset in the three-dimensional point projection can be described as $X"+=k8*r^2+k9*r^4$ and $Y"+=k10*r^2+k11*r^4$.

In another example of a distortion model that involves using angular parameter ($\tau_x$ and $\tau_y$, such as also in the case of a thin prism model) the following expression (referred to as a tilt matrix) can be used:

$$R(\tau_x, \tau_y) = \begin{vmatrix} \cos(\tau_y) & 0 & -\sin(\tau_y) \\ 0 & 1 & 0 \\ \sin(\tau_y) & 0 & \cos(\tau_y) \end{vmatrix} \times \begin{vmatrix} 1 & 0 & 0 \\ 0 & \cos(\tau_x) & \sin(\tau_x) \\ 0 & -\sin(\tau_x) & \cos(\tau_x) \end{vmatrix}.$$

By using the pose associated with each of the selected images, the computer system receives the three-dimensional coordinates of the features in the pose, where these coordinates are expressed as: $P_{ij\_global}=R_{pattern}*P_{ij\_local}+P_{pattern}$. $P_{ij\_global}$ and $P_{ij\_local}$ are three-dimensional positions of any feature in the global and local coordinate systems correspondently, $R_{pattern}$ is a rotation matrix of the pattern, and $P_{pattern}$ is a position of the pattern.

After determining the correspondences between the three-dimensional coordinates (in the global coordinate system, millimeters) and the two-dimensional coordinates (in the image coordinate system, pixels) for any image, a perspective-n-point problem (PnP) can be resolved for estimating the pose of a calibrated camera device from "n" three-dimensional to two-dimensional feature correspondences. The camera device's pose ($Rk_{camera}$, the camera device's rotation for $k^{th}$ image, and $Pk_{camera}$, the camera device's position for $k^{th}$ frame) is received for any image.

The computer system can then estimate an initial camera projection plane rotation ($R_{camera}$) and an initial camera focus position ($P_{camera}$) as a weighted mean of the received pose data: $R_{camera}=\Sigma^n_{k=0}$ weight_k*$Rk_{camera}$ and $P_{camera}=\Sigma^n_{k=0}$ weight_k*$Pk_{camera}$. The weights can be computed as a normalized re-projection error in PnP solution for each image. A re-projection error can be computed by determining a projection of the object in a pose (or features thereof) on an image plane of the camera device and an error (e.g., distance error) between the projection and the two-dimensional coordinates of the object (or the features thereof) in the image that shows the pose.

Using the camera calibration parameters and the initial pose estimation, the intrinsic and extrinsic parameters can be estimated by applying a fitting model to the camera calibration parameters (including any of the extrinsic camera parameters, the intrinsic camera parameters, and/or the distortion parameters). Generally, the fitting model is a data fitting model that iteratively estimates the camera calibration parameters such that the re-projection errors are reduced or minimized. Different types of data fitting models are possible, such as Levenberg-Marquardt nonlinear least squares algorithm, a chi-square test algorithm, a curve fitting algorithm, a weighted least square fittings algorithm, a polynomial regression algorithm, a Gauss-Newton algorithm, shift-cutting algorithm, a gradient algorithm, a Nelder-Mead (simplex) search algorithm, etc. When the camera device remains static during the camera calibration procedure, the number of variables in the fitting model may depend on the camera intrinsic parameters and the distortion model and may not depend on the number of the images that were selected, because the same camera device pose is expected for all images. The reprojection error is used in the least-squares curve fitting problem. Additionally, or alternatively, the fitting model can include a machine learning model, such as a regression model or a convolutional neural network, trained using multiple known camera models, known object poses, and training images showing such object poses.

Further, the fitting model can be invoked twice. The first time, the full set of selected images are used to estimate the camera model and processed by the fitting model. Next, a subset of the selected images is used. The subset can be selected by selecting the images with the smallest re-projection errors (e.g., if thirty to sixty images were selected, a subset of ten to twenty images, or some other number, having the smallest re-projection errors is selected). The subset can be re-processed again by the fitting model to further refine the parameters of the camera model.

At operation 1010, the computer system determines a pose of the marker attached to the camera. For example, the marker was attached prior to the start of the camera calibration procedure. Its pose can be determined from pose data generated by, for instance, the motion capture system. During the camera calibration procedure, the camera may remain static. In such a situation, the pose data does not substantially vary during the camera calibration procedure. Accordingly, the position and rotation of the marker can be computed in the global coordinate system as the average value of its pose data.

At operation 1012, the computer system determines a rotation offset and a position offset of the camera device's focal point based on the pose of the marker and the camera model. For example, the marker's pose indicates a first rotation of the marker in the real-world space (e.g., in the global coordinate system, where this first rotation is expressed as a rotation matrix $R_{marker}$ around the X, Y, and Z axes). The camera model (e.g., one or more of the extrinsic camera parameters thereof) can indicate a second rotation of the focal point (e.g., where this second rotation is expressed as a rotation matrix $R_{camera}$ around the X, Y, and Z axes). The rotation offset can be determined based on the first rotation and the second rotation, such as by using the following expression: $R_{offset}=R_{camera}*R_{marker}^{-1}$, where $R_{marker}^{-1}$ is the inverse of the marker's rotation matrix $R_{marker}$.

The marker's pose also indicates a first position of the marker in the real-world space (e.g., in the global coordinate system, where this first position is expressed as a position matrix $T_{marker}$ along the X, Y, and Z axes). The camera model (e.g., one or more of the extrinsic camera parameters thereof) can indicate a second position of the focal point (e.g., where this second position is expressed as a position matrix $T_{camera}$ along the X, Y, and Z axes). The position offset can be determined based on the first rotation, the first position, and the second position, such as by using the following expression: $T_{offset}=R_{marker}^{-1}*(T_{camera}-T_{marker})$.

FIG. 11 illustrates an example of a flow for associating pose data with image data in the camera calibration procedure, in accordance with embodiments of the present disclosure. The associations are time-based. Operations of the flow of FIG. 11 can be implemented as sub-operations of the flow of FIG. 9 and/or of the flow of FIG. 10. In an example, the flow of FIG. 11 may start at operation 1102, where the computer system receives motion capture data indicating poses of the object over time. For example, the motion capture system generates the motion capture data at a particular frame rate (e.g., 144 FPS) and sends this data to the computer system.

At operation 1104, the computer system receives image data representing a video stream of the object's poses. For example, the camera device generates the image data as video frames at a particular frame rate (e.g., 24 FPS) and sends this data to the computer system.

At operation 1106, the computer system determines a change in the motion capture data over time. The change can be to a magnitude and/or a slope of any of x, y, or z coordinate or x, y, z rotations.

At operation 1108, the computer system determines poses of the object based on the change. The change can be compared to a threshold value defined for each of x, y, and z axes. If smaller for all three axes, a pose is detected and is associated with a time window during which the change is smaller than the threshold value. Otherwise, a transition between a current pose and a next pose is detected.

At operation 1110, the computer system associates the images with the poses based on timing of the poses and the images. For example, each received image has a time stamp. Each pose is associated with a time window. If a time stamp of an image falls within a time window of a pose, the image is associated with the pose, where the association indicates that the image shows the pose.

Figure 12:
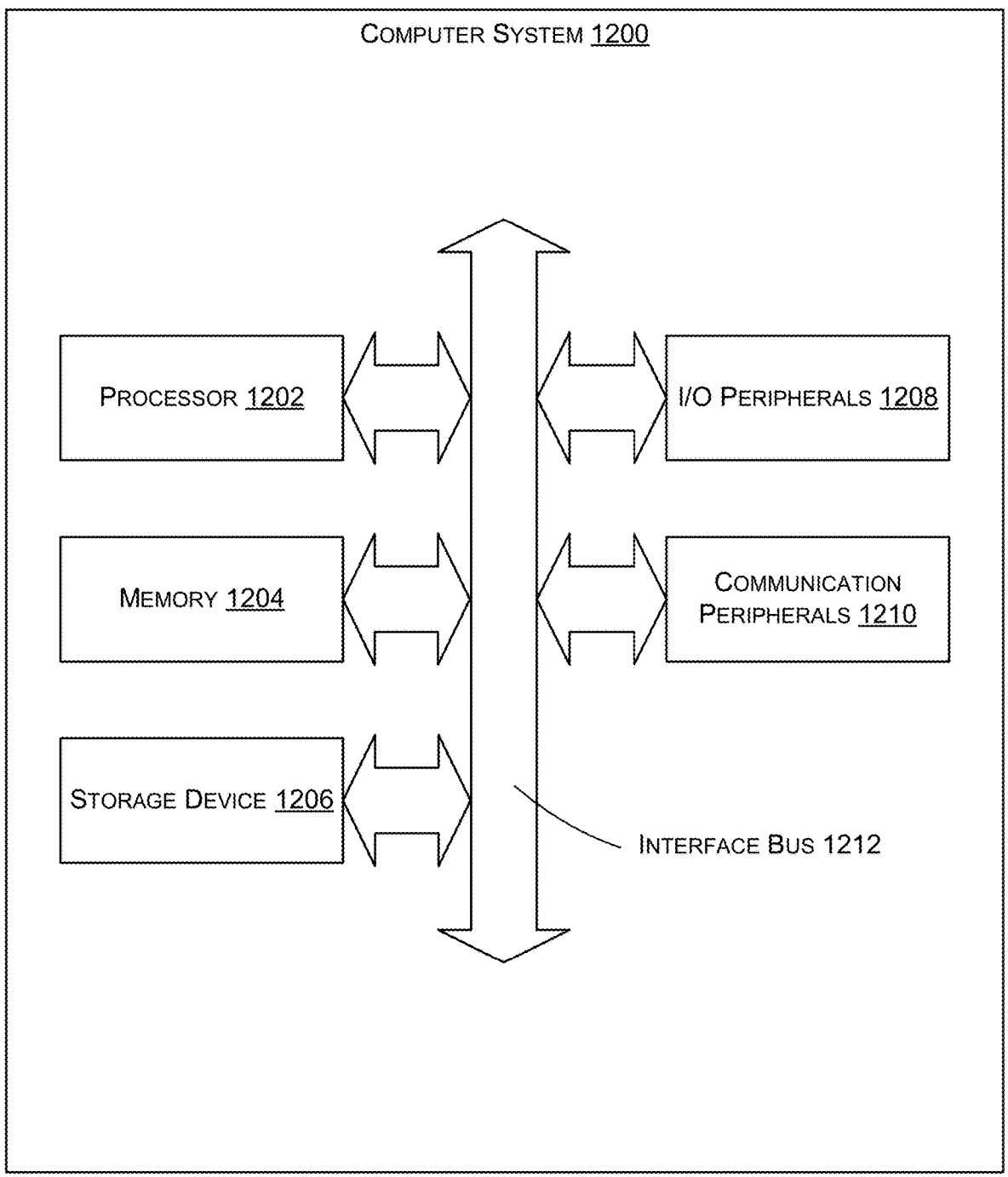
FIG. 12 illustrates example components of a computer system, in accordance with embodiments of the present disclosure.

FIG. 12 illustrates example components of a computer system 1200, in accordance with embodiments of the present disclosure. The computer system 1200 is an example of the computer system 140 or 430. Although the components of the computer system 1200 are illustrated as belonging to a same computer system 1200, the computer system 1200 can also be distributed (e.g., between multiple user devices).

The computer system 1200 includes at least a processor 1202, a memory 1204, a storage device 1206, input/output peripherals (I/O) 1208, communication peripherals 1210, and an interface bus 1212. The interface bus 1212 is configured to communicate, transmit, and transfer data, controls, and commands among the various components of the computer system 1200. The memory 1204 and the storage device 1206 include computer-readable storage media, such as RAM, ROM, electrically erasable programmable read-only memory (EEPROM), hard drives, CD-ROMs, optical storage devices, magnetic storage devices, electronic non-volatile computer storage, for example Flash® memory, and other tangible storage media. Any of such computer readable storage media can be configured to store instructions or program codes embodying aspects of the disclosure. The memory 1204 and the storage device 1206 also include computer readable signal media. A computer readable signal medium includes a propagated data signal with computer readable program code embodied therein. Such a propagated signal takes any of a variety of forms including, but not limited to, electromagnetic, optical, or any combination thereof. A computer readable signal medium includes any computer readable medium that is not a computer readable storage medium and that can communicate, propagate, or transport a program for use in connection with the computer system 1200.

Further, the memory 1204 includes an operating system, programs, and applications. The processor 1202 is configured to execute the stored instructions and includes, for example, a logical processing unit, a microprocessor, a digital signal processor, and other processors. The memory 1204 and/or the processor 1202 can be virtualized and can be hosted within another computer system of, for example, a cloud network or a data center. The I/O peripherals 1208 include user interfaces, such as a keyboard, screen (e.g., a touch screen), microphone, speaker, other input/output devices, and computing components, such as graphical processing units, serial ports, parallel ports, universal serial buses, and other input/output peripherals. The I/O peripherals 1208 are connected to the processor 1202 through any of the ports coupled to the interface bus 1212. The communication peripherals 1210 are configured to facilitate communication between the computer system 1200 and other systems over a communications network and include, for example, a network interface controller, modem, wireless and wired interface cards, antenna, and other communication peripherals.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification or claims refer to at least one of something selected from the group consisting of A, B, C ... and N, the text should be interpreted as requiring only one element from the group, not A plus N, or B plus N, etc.

What is claimed is:

1. A computer-implemented method comprising:
   determining a first pose of a marker in a real-world space, wherein the marker is attached to a camera device;
   determining an offset between the marker and a control point of the camera device based at least on the first pose;
   setting a second pose of a virtual camera in a virtual space based at least on the offset, wherein the virtual camera represents the camera device in the virtual space; and rendering, on a display, content based at least on the second pose of the virtual camera.

2. The computer-implemented method of claim 1, wherein determining the offset comprises:
   determining a first rotation of the marker in the real-world space based at least on the first pose;
   determining a second rotation of the control point based at least on at least one calibration parameter; and
   determining a rotation offset based at least on the first rotation and the second rotation.

3. The computer-implemented method of claim 2, wherein determining the offset further comprises:
   determining a first position of the marker in the real-world space based at least on the first pose;
   determining a second position of the control point based at least on the at least one calibration parameter; and
   determining a position offset based at least on the first rotation, the first position, and the second position.

4. The computer-implemented method of claim 1, wherein the second pose is set as a translation and rotation of the first pose based at least on the offset.

5. The computer-implemented method of claim 1, wherein rendering the content comprises:
   determining a virtual display area in the virtual space based at least on the second pose;
   determining a portion of the content that is associated with the virtual display area;
   determining a distortion model based at least on a camera model of the camera device; and
   distorting the portion of the content based at least on the distortion model.

6. The computer-implemented method of claim 1, wherein rendering the content further comprises determining a camera model of the camera device, wherein the camera model is determined based at least on a calibration procedure that comprises:
   determining a plurality of poses of an object in the real-world space;
   receiving a plurality of images generated by the camera device, wherein the plurality of images represents a video stream that shows the object in the plurality of poses; and
   determining, based at least on the plurality of poses and the plurality of images, the camera model of the camera device, wherein the camera model comprises extrinsic camera parameters, intrinsic camera parameters, and a distortion model.

7. The computer-implemented method of claim 1, further comprising determining at least one calibration parameter of the camera device based on a camera calibration procedure that comprises:
   determining a third pose of an object in the real-world space;
   receiving an image generated by the camera device, wherein the image shows the object while the object is in the third pose; and
   determining, based at least on the third pose and the image, the at least one calibration parameter.

8. The computer-implemented method of claim 7, wherein the camera calibration procedure is performed while one of the camera device or the object is static and a remaining one of the camera device or the object is movable.

9. The computer-implemented method of claim 7, wherein the camera calibration procedure further comprises:
   determining a plurality of poses of the object in the real-world space while the camera device remains in a same pose;
   receiving a plurality of images generated by the camera device, wherein the plurality of images represents a video stream that shows the object in the plurality of poses;
   determining that the third pose is shown in the image;
   determining a projection error between the image and a projection of the object in the third pose onto an image plane of a camera model of the camera device, wherein the camera model comprises the at least one calibration parameter;
   selecting a subset of images of the plurality of images based at least on projection errors, wherein the subset of images is associated with a subset of poses of the plurality of poses; and
   updating the camera model based at least on the subset of images and the subset of poses.

10. The computer-implemented method of claim 7, wherein the camera calibration procedure further comprises:
    determining a projection error between the image and a projection of the object in the third pose onto an image plane of a camera model of the camera device, wherein the camera model comprises the at least one calibration parameter; and
    updating the camera model based at least on a fitting model that reduces projection errors, wherein an output of the fitting model indicates one or more parameters of the camera model.

11. The computer-implemented method of claim 7, wherein the camera calibration procedure further comprises:
    determining a first estimated pose of the camera device based at least on the third pose of the object and the image;
    determining a projection error between the image and a projection of the object in the third pose onto an image plane of a camera model of the camera device, wherein the camera model comprises the at least one calibration parameter;
    associating a first weight with the first estimated pose based at least on the projection error;
    determining a final estimated pose of the camera device based at least on the first estimated pose and the first weight; and
    updating the camera model based at least on a fitting model that uses the final estimated pose and projection errors.

12. The computer-implemented method of claim 1, further comprising determining at least one calibration parameter of the camera device based at least on a camera model of the camera device, wherein the camera model is determined based at least on a camera calibration procedure that comprises:
    receiving motion capture data that represents a plurality of poses of an object in the real-world space over time while the camera device remains in a same pose;
    determining, based at least on a change in the motion capture data, a first timing of a third pose of the object; and
    determining, based at least on the third pose, the at least one calibration parameter.

13. The computer-implemented method of claim 12, wherein the camera calibration procedure further comprises:
    receiving image data that represents a plurality of images generated by the camera device over time while the camera device remains in the same pose, wherein the plurality of images represents a video stream that shows the object in the plurality of poses; and associating the third pose with an image of the plurality of images based at least on the timing of the third pose and a second timing of the image, wherein the at least one calibration parameter is determined further based at least on the timing.

14. A system comprising:
one or more processors; and
one or more memory storing instructions that, upon execution by the one or more processors, configure the system to:
  determine a first pose of a marker in a real-world space, wherein the marker is attached to a camera device;
  determine an offset between the marker and a control point of the camera device based at least on the first pose;
  set a second pose of a virtual camera in a virtual space based at least on the offset, wherein the virtual camera represents the camera device in the virtual space; and
  render, on a display, content based at least on the second pose of the virtual camera.

15. The system of claim 14, wherein rendering the content further comprises determining a camera model of the camera device, wherein the camera model is determined based at least on a calibration procedure that comprises:
  determining a plurality of poses of an object in the real-world space;
  receiving a plurality of images generated by the camera device, wherein the plurality of images represents a video stream that shows the object in the plurality of poses; and
  determining, based at least on the plurality of poses and the plurality of images, the camera model.

16. The system of claim 15, wherein the object is placed in the plurality of poses by a robotic system.

17. The system of claim 15, wherein the marker comprises marker units, wherein the object comprises a pattern of features, and wherein a feature of the pattern of features and a marker unit of the marker have substantially a same size.

18. One or more non-transitory computer-readable storage media storing instructions that, upon execution on a system, cause the system to perform operations comprising:
  determining a first pose of a marker in a real-world space, wherein the marker is attached to a camera device;
  determining an offset between the marker and a control point of the camera device based at least on the first pose;
  setting a second pose of a virtual camera in a virtual space based at least on the offset, wherein the virtual camera represents the camera device in the virtual space; and
  rendering, on a display, content based at least on the second pose of the virtual camera.

19. The one or more non-transitory computer-readable storage media of claim 18, wherein determining the offset comprises:
  determining a first rotation and a first position of the marker in the real-world space based at least on the first pose;
  determining a second rotation and a second position of the control point based at least on at least one calibration parameter; and
  determining a rotation offset based at least on the first rotation and the second rotation.

20. The one or more non-transitory computer-readable storage media of claim 18, wherein the second pose is set as a translation and rotation of the first pose based at least on the first pose.

* * * * *